(12) United States Patent
Dreessen

(10) Patent No.: US 11,132,533 B2
(45) Date of Patent: Sep. 28, 2021

(54) SYSTEMS AND METHODS FOR CREATING TARGET MOTION, CAPTURING MOTION, ANALYZING MOTION, AND IMPROVING MOTION

(71) Applicant: David Scott Dreessen, Orinda, CA (US)

(72) Inventor: David Scott Dreessen, Orinda, CA (US)

( * ) Notice: Subject to any disclaimer, the term of this patent is extended or adjusted under 35 U.S.C. 154(b) by 479 days.

(21) Appl. No.: 15/997,536

(22) Filed: Jun. 4, 2018

(65) Prior Publication Data
US 2018/0357472 A1 Dec. 13, 2018

Related U.S. Application Data

(60) Provisional application No. 62/516,204, filed on Jun. 7, 2017.

(51) Int. Cl.
*G06K 9/00* (2006.01)
*G06T 7/246* (2017.01)
(Continued)

(52) U.S. Cl.
CPC ..... *G06K 9/00335* (2013.01); *G06K 9/00342* (2013.01); *G06K 9/00765* (2013.01); *G06K 9/6202* (2013.01); *G06T 3/60* (2013.01); *G06T 7/20* (2013.01); *G06T 7/251* (2017.01); *G06T 7/30* (2017.01); *G06T 11/00* (2013.01); *G06K 9/00671* (2013.01); *G06N 20/00* (2019.01);
(Continued)

(58) Field of Classification Search
None
See application file for complete search history.

(56) References Cited

U.S. PATENT DOCUMENTS

| | | | |
|---|---|---|---|
| 7,804,998 B2 | 9/2010 | Mundermann et al. | |
| 2004/0170385 A1* | 9/2004 | Bhadkamkar | H04N 5/602 386/343 |

(Continued)

OTHER PUBLICATIONS

Corazza et al. "Automatic Generation of a Subject Specific Model for Accurate Markerless Motion Capture and Biomechanical Applications", IEEE Transaction of Biomedical. Eng., vol. 57, No. 4, Apr. 2010.

(Continued)

*Primary Examiner* — Matthew C Bella
*Assistant Examiner* — Brian D Shin
(74) *Attorney, Agent, or Firm* — Perkins Coie LLP

(57) ABSTRACT

The present technology enables viewing, analyzing, and improve a variety of motions for a subject by facilitating comparison to a target video. Motions can include activities such as walking, athletic activities, and educational activities. The comparison can be accomplished by adjusting spatial aspects of a target and subject video to match. The comparison can also include identifying synchronization points, between the videos, that identify a temporal correspondence between of motions or objects in the videos and adjusting playback of one or more segments in the videos so corresponding synchronization points are displayed at the same time during playback. A version of one of the videos can be provided as an outline or as partially transparent, which can be overlaid with the other video to create a video combination for playback.

27 Claims, 19 Drawing Sheets

(51) Int. Cl.
  *G06T 11/00* (2006.01)
  *G11B 27/10* (2006.01)
  *G06K 9/62* (2006.01)
  *G06T 7/20* (2017.01)
  *G06T 3/60* (2006.01)
  *G06T 7/30* (2017.01)
  *G06N 20/00* (2019.01)

(52) U.S. Cl.
  CPC ........... *G06T 2207/30196* (2013.01); *G06T 2207/30221* (2013.01); *G11B 27/10* (2013.01)

(56) References Cited

U.S. PATENT DOCUMENTS

| | | |
|---|---|---|
| 2005/0272517 A1 | 12/2005 | Funk et al. |
| 2006/0290821 A1* | 12/2006 | Soupliotis ............. H04N 7/012 348/701 |
| 2009/0148000 A1 | 6/2009 | Madsen et al. |
| 2009/0232353 A1 | 9/2009 | Sundaresan et al. |
| 2009/0324191 A1* | 12/2009 | Reusens ................. H04N 5/265 386/353 |
| 2010/0285877 A1 | 11/2010 | Corazza |
| 2015/0373231 A1* | 12/2015 | Biswas ................ H04N 21/233 348/515 |

OTHER PUBLICATIONS

Corazza et al. "A markerless motion capture system to study musculoskeletal biomechanics: visual hull and simulated annealing approach" Annals of Biomedical. Engineering, 2006, 34(6):1019-29.

Mundermann et al. "Accurately measuring human movement using articulated ICP with soft-joint constraints and a repository of articulated models" Department of Mechanical Engineering, Stanford University, Stanford, CA, CVPR 2007.

* cited by examiner

SYSTEMS AND METHODS FOR CREATING TARGET MOTION, CAPTURING MOTION, ANALYZING MOTION, AND IMPROVING MOTION

CROSS REFERENCE TO RELATED APPLICATION

This application claims priority to U.S. Provisional Patent Application No. 62/516,204, titled "Systems and Methods for Creating Target Motion, Capturing Motion, Analyzing Motion, and Improving Motion," filed Jun. 7, 2017, which is herein incorporated by reference in its entirety.

TECHNICAL FIELD

The present technology generally relates to motion analysis and improvement and more specifically to the use of video and/or sensor data in markets including, but not limited to sports, dance, performance arts, martial arts, orthopedics/medical, animation, entertainment, and gaming.

BACKGROUND

The field of developing proper motion or mechanics is very large and diverse. Coaches, instructors, magazines, books, online resources, and DVDs, among other resources are all used extensively by users to help improve their mechanics and performance. Additionally, there is a large market for training aids to help develop the proper mechanics. This is very pronounced in the golf community. Video recording and analysis is used regularly. Again, this is prevalent in the golf market, where golfers record and view their own swing for analysis. Golfers, for example, can view videos of professionals to see how their swing varies compared to the professional. The golfer may get a copy of the video where they can review the video and key learnings from the lesson and work to incorporate changes in his or her mechanics. Many hours of practice are then generally required to incorporate changes to the point that they feel natural or become part of the natural motion for the golfer. Similar methods are used for a variety of other markets. Similar tools exist for other markets, but the breadth of activities covered and availability of cost effective teaching is limited. For example, a video golf lesson is often $100+/hour, with multiple lessons often required to make meaningful adjustments to mechanics. Some individuals who seek out the most well-known instructors spend several 10's of thousands or more on golf lessons over the course of a year.

Smartphones (e.g., iPhone) and tablets (e.g., iPad) provide useful tools for video capture, distributed computing, and data transmission to a central server. Notably, the functionality and performance of these devices is rapidly improving and the market penetration of devices continues to grow. Video camera functionality on these devices has been improving significantly, including the launch of 3-dimensional (3D) cameras like that in the LG Optimus 3D smartphone that comes with a 3D camera that consists of two independent 5-megapixel CMOS sensors with an interaxial distance of about 2.5 centimeters, a distance which is suitable for shooting not so distant objects in 3D mode. Video camera functionality is expected to continue to improve, with higher video resolution, faster shutter speed, and both more prevalent and better 3D capability. Additionally, these devices often include sensors such as accelerometers, magnetometer, and a gyroscope to allow the position and movement of the device to be tracked.

There is an emerging market developing for the use of smartphones and/or tablets to help provide instruction. For example, Golfshot has developed an iPhone and iPad application for side by side comparison of videos. In the GolfShot case, a user can record a swing that can be compared side by side with Tiger Woods, a well-known golfer with well-recognized excellent swing mechanics.

Video editing software from companies such as Adobe is used extensively to prepare video for film, TV, and web applications. Software includes many features including cutting and sizing video, sequencing video clips, changing background, cutting out undesired elements, adding in other elements (e.g., explosions), overlaying videos, changing opacity, background elimination, drawing with paint tools, finding edges of objects, color changing, color elimination, time remapping (e.g., speeding up or slowing down between segments), rotoscoping to cut out moving objects, and numerous other features that help users modify videos to suit their specific needs.

Markerless motion capture is a developing field that has been driven largely by the animation and gaming communities. Markerless motion capture is a term used to describe the capture of the motion of a subject in 3D space without the assistance of markers to provide indications of articulated joints. Techniques for performing markerless motion capture are describe in U.S. patent application Ser. No. 11/716,130 to Mundermann et al., entitled "Markerless Motion Capture System". Techniques for performing markerless motion capture are also described in Corazza et al. "A markerless motion capture system to study musculoskeletal biomechanics: visual hull and simulated annealing approach" Annals of Biomedical. Engineering, 2006, 34(6): 1019-29, Mundermann et al. "Accurately measuring human movement using articulated ICP with soft-joint constraints and a repository of articulated models" CVPR 2007, and Corazza et al. "Automatic Generation of a Subject Specific Model for Accurate Markerless Motion Capture and Biomechanical Applications", IEEE Transaction of Biomedical. Eng., 2009.

The use of sensors that track motion to provide useful data is a large and growing field. This includes a variety of sensors used for motion capture for a variety of applications, including motion analysis for improvement of sports performance and other applications. Companies like Skypro provide sensors to track moving objects such as a golf club, bat, tennis racquet, or body part (e.g., back of wrist). K-vest provides wearable devices (e.g., vest) to provide useful data for a golf swing and other motions. In some cases, these devices are connected to a smart phone where applications present useful data. Other companies like trackman provide a launch monitor for golf to provide useful information such as club head speed, ball speed, ball launch vector, club path, face angle, attack angle, and an estimate or measurement of the carry distance and total distance of the ball. Foresight Sports provides a golf simulator that has a stereoscopic lens to provide spatial recognition with high resolution of the club path and ball before, during and after contact of the club with the ball. With this information, the flight of the ball can be estimated. This system is used for virtual golf applications.

Human joints and motion skeletal biomechanics models have been built from companies such as Kineman. These skeletal models can be applied to pictures or video images to replicate poses from images accurately. Where skeletal models are referenced, this may range from a full skeletal model with every bone to a simplified model showing line segments for major bones.

Crowdsourcing is the practice of obtaining needed services, ideas, or content by soliciting contributions from a large group of people, and especially from an online community, rather than from traditional employees or suppliers. Crowdsourcers are primarily motivated by its benefits. One of these includes the ability to gather large numbers of solutions and information at a relatively inexpensive cost. Users are motivated to contribute to crowdsourced tasks by both intrinsic motivations, such as social contact, intellectual stimulation, and passing time, and by extrinsic motivations, such as financial gain.

SUMMARY

In the present technology, systems and methods are used to enable a user (i.e., the operator of the system) to record, view, analyze, and/or improve a variety of body motions for a subject (i.e., the human, animal, object, or mechanical device that is recorded Often the user and the subject will be the same human). Motions include simple activities such as walking, more complex athletic activities such as a golf swing, tennis serve, running, batting, throwing, track & field, dancing, performance arts including ballet, martial arts, as well as other diverse potential applications such as sign language. Additionally, there are a variety of medical applications such as recovery from injuries or tracking conditions like Parkinsons. Furthermore, the present technology can be used in education, such as for training a surgeon in performing certain motions.

The present technology has several advantages over existing motion development systems. While some systems incorporate some aspects, both the combination and many of the systems and methods of implementation are unique.

The present technology can use devices that many potential users already own such as smartphones (e.g., iPhone, Android, etc.) or tablets (e.g., iPad) to obtain individualized motion data.

The present technology allows for the use of target motion videos with a transparent (or near transparent) background that can be played on top of subject motion videos to allow for easy comparison.

The present technology can allow a comparison of a subject video with an expert "target" video by videoing a subject from a similar angle as an available expert video(s) (i.e., target motion). The subject and the expert video can be sized and synchronized in time and/or in space such that the motion in the expert video can be overlaid on top of the motion of the subject video (or vice versa). In one or more views, the person in the video on top is manipulated so that both motions can be seen simultaneously (e.g., only the outline of the subject's body and other defining objects such as a belt are shown, with the rest of the top video transparent).

The present technology can combine the videos into a single video for easy viewing, sharing, and distribution.

The present technology allows for the development of target motion transparent background videos (or subject videos) through crowdsourcing. Users can upload a video of interest and the system uses computer vision techniques to isolate the motion/remove unwanted background from the videos in a simple automated or semi-automated process. The easy and efficient development of target videos enables a vast array of target videos to be developed for a variety of activities.

The present technology allows for automatic stabilization of videos of the target motion to reduce unwanted movement of the video associated with a handheld or moving camera.

The present technology can allow users to develop 3D body and skeletal models customized to an individual by superimposing a skeletal or body model with available photos and/or videos. It allows for adjusting with simple manual techniques to make the skeletal model fit the individual.

The present technology can use an emerging technology called markerless motion capture to develop these models in a more automated or completely automated fashion.

The present technology can allow a personalized skeletal and body model to be reused for multiple motions and updated and improved through additional video data (e.g., different views of a golf swing and view of subject dancing).

The present technology can allow users to develop target 3D motion models (i.e., digitized skeletal or body model moving through desired motion) from available videos by superimposing the skeletal and/or body model with video and/or still frames of the motion to be developed. The present technology can use markerless motion capture to develop these models in a more automated or completely automated fashion. The present technology can update the skeletal and body models where video data shows a conflict with the existing model, thereby improving the skeletal and/or body model.

The present technology can allow the development of a vast array of motion models through crowdsourcing where users can develop skeletal/body models and motion models for a variety of individuals and motions, including experts in a selected area. Further, users can improve on existing models developed by others by selecting and processing additional photos or video for the individual in the model. Motion models developed from video of experts will often be used as target motions for users.

The present technology can allow users to create target motions from the subject for use as a target motion for the subject, or for others to use as target motions.

The present technology can develop motion models into target motions that are customized for a subject's actual body dimensions. Uniquely, video data can be processed to allow users to see the subject performing the target motion. Several tools are provided to allow users to select and develop appropriate target motions.

The present technology can present target motions as 3D models at both the body and the skeletal level and allows superimposing the actual motion and/or motion model with the target motion and/or motion model in 3D. Additionally, the pace of the motion can be synchronized throughout the motion. This allows a significant improvement in allowing the user to clearly see deviation from the target motion.

The present technology can show differences from known best practices and experts in the field, or user defined target motion.

The present technology can allow training at any pace (e.g., slow motion) with the superimposed target models and/or motions viewed on a screen over the subject while the subject conducts the motion. This allows the subject to develop the proper feel of the motion. Specific body parts can be isolated for training, if desired.

For 3D model comparison, the present technology can present 3D models that update the displayed view of the model based on movement of the smartphone relative to the subject, thereby automatically presenting a similar view of the model and the subject from any camera angle to provide for easy comparison.

For 2-dimensional (2D) video comparison, the present technology can use target motions that have videos from multiple angles to automatically present the video that best aligns with the view of the subject being viewed or recorded and it can direct the user to locate a camera position that aligns well with available images of the target.

The present technology can gather camera locations with a crowdsourced model to obtain and provide camera locations that work for capturing a video to compare with a target video. The present technology can provide search tools and user ratings of motion models to help identify target motions.

The present technology can allow crowdsourcing to enable users to provide analysis tools, instruction, and/or training programs for other users.

The present technology can allow users to view a subject in a screen compared to a target model from any available viewing angle.

Other embodiments of the present technology utilize other video capture and computer configurations and/or body sensors or markers to provide alternative or additional data. Systems used in the present technology include a device or devices that provide one or more of video optics, data acquisition, communication, and computing. The embodiments of the present technology include various configurations of these components including, but not limited to use of smartphones and tablets that provide video optics, data acquisition, communication, and computing capability in a single device. In this description, a smartphone, tablet, or camera attached to computing device are used interchangeably. The computing capability may be located on a local device, on a remote server; or shared between the local computing device and a remote server.

The following references are incorporated herein by reference: U.S. Patent Publication US 2010/0285877—Distributed Markerless Motion Capture; U.S. Pat. No. 7,804,998—Markerless Motion Capture System; U.S. Patent Publication 2009/0232353—Method and System for Markerless Motion Capture Using Multiple Cameras; U.S. Patent Publication 2005/0272517—Swing Position Recognition and Reinforcement; and U.S. Patent Publication 2009/0148000—System and Method for Motion Capture. To the extent the references incorporated herein by reference conflict with the present disclosure, the present disclosure controls.

DETAILED DESCRIPTION

Systems and methods for creating target motion, capturing motion for review, analysis, and improvement are described. The system is designed to be a platform that allows users to select from a variety of categories including, but not limited to golf, baseball, softball, basketball, football, soccer, tennis, squash, racquetball, track & field, gymnastics, diving, swimming, skiing, boarding, dancing, sign language, or other activities where motion is performed. These categories can be specified by the company or defined directly by the users of the system. Within each category, numerous target motions may be included. For example, golf may include not only swings based on club type, but also putting, chipping, pitching, sand shots, hooks, slices, etc. There are a vast number of motions that could be included in the dance category. The system allows users to submit data to develop target motions including those of known experts in the area. Currently, the development of user generated video data is common practice for sports and dance. For example, videos are provided on various video posting sites (e.g., YouTube). However, a system allowing users to create, compare, and analyze videos or motion models as described herein does not exist.

The following detailed description provides embodiments of the system where comparison of the subject and target is based on 2D videos, 3D models, and a mix of 3D models and 2D videos. In various implementations described herein, either 2D or 3D videos are described. However, in some embodiments, where 2D videos are described 3D videos can be used instead and in some embodiments where 3D videos are described 2D videos can be used instead. For example, some embodiments will use the subject video directly for comparison, while some embodiments will use a 3D model of the subject derived from video data.

Figure 1:
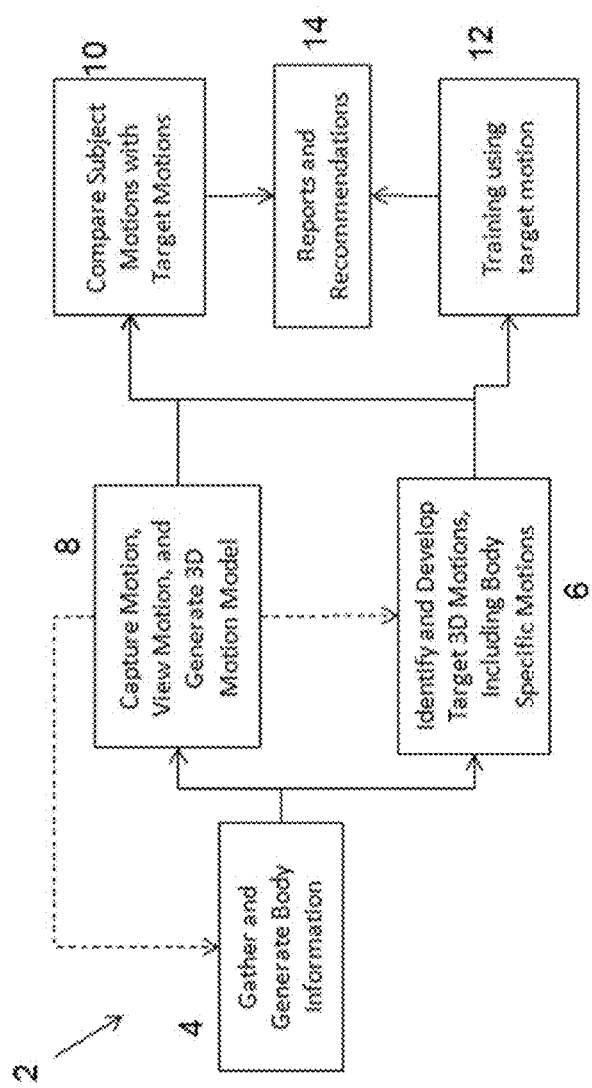
FIG. 1 is a high-level application process flow in accordance with an embodiment of the present technology.

FIG. 1 provides an overview of a process for motion improvement in accordance with a 3D model embodiment of the present technology. The process 2 commences with gathering and generating body and/or skeletal information (4). In varying order depending on the specific scenario, the user then: identifies and develops (6) target 3D motions, including body specific motions; and captures motion, views motion, and generates a 3D motion model (8). The user can compare (10) subject motions with target motions, train (12) using target motion, and review reports and recommendations (14). In one embodiment, gathering and generating body and/or skeletal model (4) is performed with capture motion, view motion, and generate 3D motion model (8).

1. Subject Body Measurements

Figure 2:
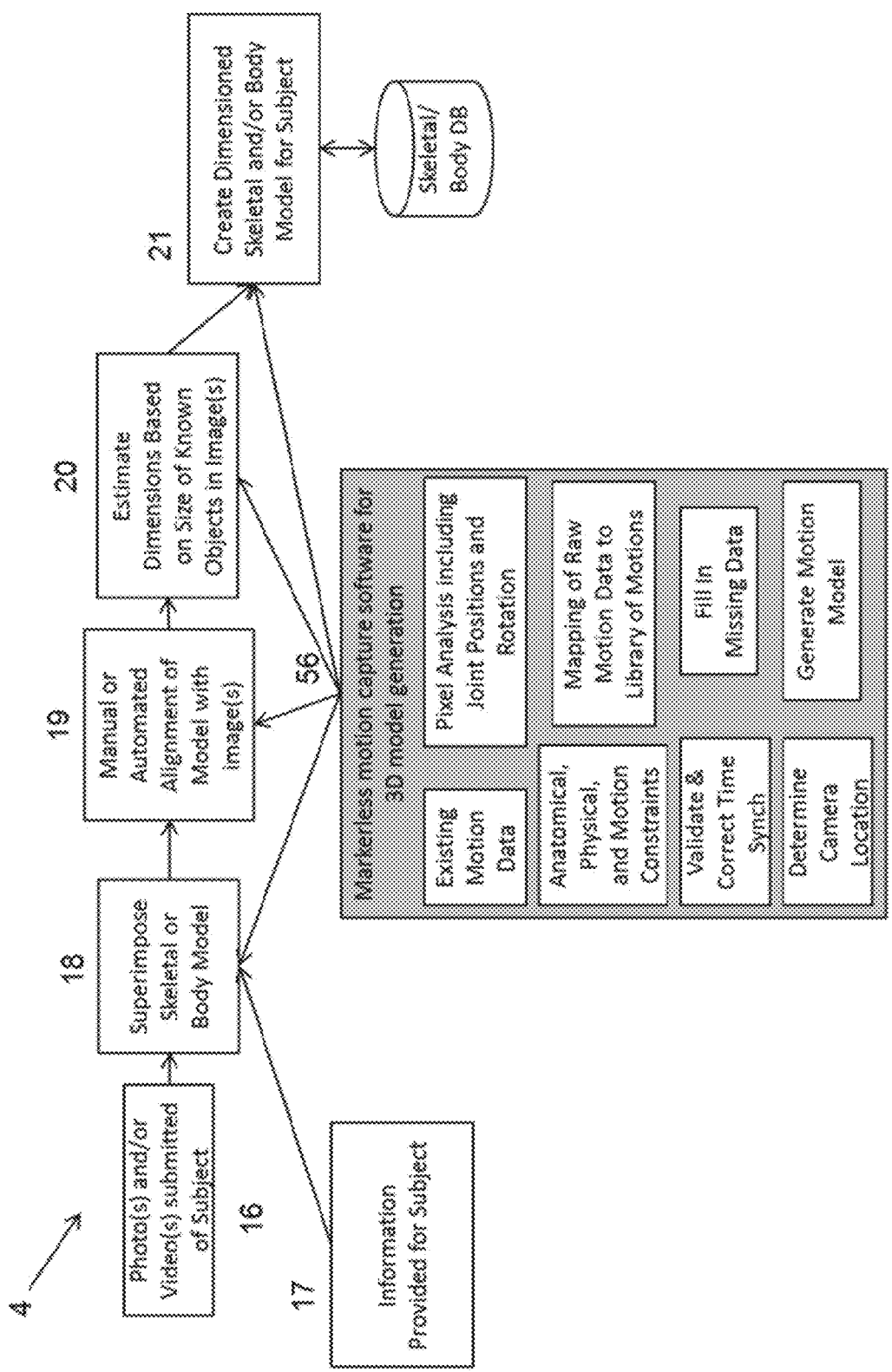
FIG. 2 is a process flow for gathering and generating body information in accordance with an embodiment of the present technology.

FIG. 2 shows a process 4 for gathering and generating body information in accordance with an embodiment of the present technology. The body measurements of the key skeletal segments of a subject's body are obtained through user entry, analysis of photo(s), and/or analysis of video images. The user can submit (16) photos and/or videos of the subject. One or more photos of the subject in positions that allow the system to estimate the length of key joints (e.g., lower leg, upper leg, hip width, torso, shoulder width, neck, head, upper arm, lower arm, etc.) may be submitted. To simplify data processing and ensure sufficient data, an outline of the position for the subject to fit inside can be provided on a photo viewer. Alternatively, or additionally, body segment data can be obtained from video data from the subject performing a motion. This may be a recorded motion of a specific activity, random, or directed movements.

In one embodiment, information may be entered (17) for the subject that may include data such as height, weight, and gender. A skeletal model is superimposed with the photo/video image(s) (18). The skeletal model could be a generic model or a specific model selected by the user or configured by automated processing of image data to provide a better initial fit for the subject. Using tools such as touch screen, mouse click, or keyboard keys or automated techniques, the skeletal model is sized, rotated, and/or bones (and/or joints) moved to align with the image (19). If desired (e.g., information is not provided for the subject), dimensions can be estimated based on the size of known objects in the image(s) (e.g., tennis court, basketball court, basketball, ruler) or using one of various existing methods for estimating distance to an object and dimensions of objects in a smartphone screen or image (20). Alternatively, the system or user could select a dimension (e.g., height) that could be used as reference point if information is not provided for the subject and dimensioning based on known objects is not available. Lastly, using geometry to estimate the camera positioning from data in images (e.g., body segments, lines on court, etc.) and location of the overlaid skeletal data, the dimensioned skeletal model is created for the subject by combining data from available images and correcting using conflict resolution techniques (21). A variety of markerless motion capture techniques (56) or other pixel level analysis may be used to partially or fully automate the above process. A similar process could be used for a body model (e.g., body outline, body model including muscles, or other depicts of the body) instead of a skeletal model. Skeletal or body measurement data can be further refined through comparison with data obtained during motion modeling or developed directly during motion modeling.

2. Motion Modeling

Markerless motion capture techniques are used to process video to develop 3D body and/or skeletal models of subject and/or target motions. A variety of techniques can be utilized to perform markerless motion capture in accordance with the embodiments of the present technology. With models providing body and/or skeletal level motion, there is an unprecedented level of information available to analyze and improve motion. Markerless motion capture has generally been done in a controlled environment with limited background, ample lighting, and numerous fixed video optics devices, but there also has been work done to conduct in outside, or other less controlled environments. The present technology provides systems and methods to acquire data and process this data for use with markerless motion capture software. Markers or sensors may be incorporated as a supplement, or replacement to the markerless motion capture data described.

Single Motion

Figure 3:
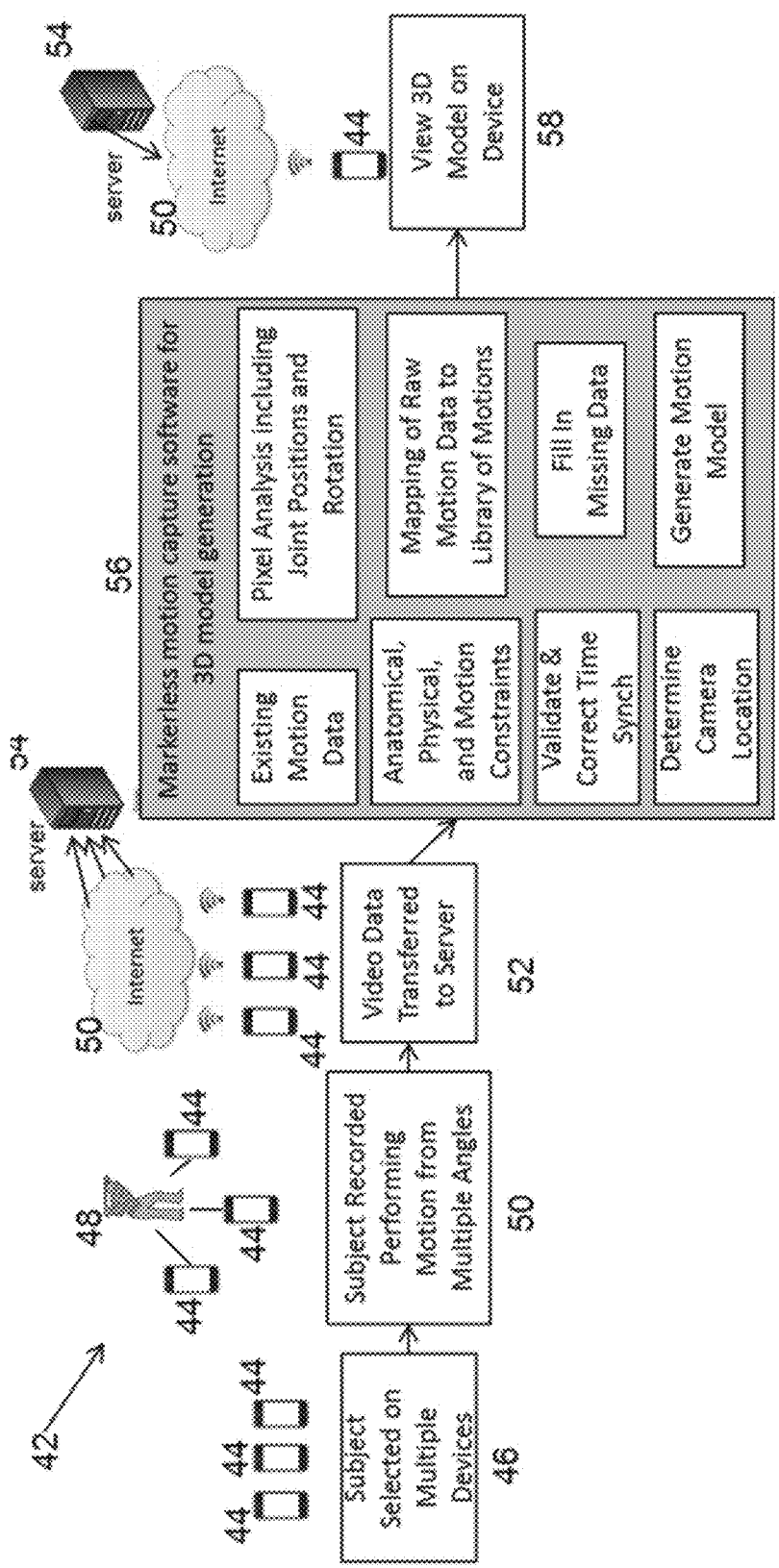
FIG. 3 is a multiple device process for capturing motion, viewing motion, and generating 3D motion models in accordance with an embodiment of the present technology.

A process 42 for capturing motion data from a single motion and processing data to produce a 3D model motion in accordance with an embodiment of the present technology is illustrated in FIG. 3. In one configuration, multiple devices 44, such as smartphones and/or tablets are used to record motion. The application is opened (or video uploaded) on each device, the subject 48 being videoed is selected (46) on multiple devices 44, and the time is (or previously has been) synchronized. The subject 48 is recorded (50) performing the motion from multiple angles. As desired by the user, video is processed and video data is transferred (52) to the server 54 by a wireless connection to the Internet 50. The processing of video data is performed automatically, or the user may view the videos to include as part of the 3D generation and choose to generate the model. Markerless motion capture software for 3D model generation (56) is used to develop a 3D model of the motion. When complete, 3D model data is transferred from the server 54 through the Internet 50 and then through wired or wireless connection to the device 44 so that users can view (58) the 3D model on a device 44.

In a 2D embodiment, the process can end after videos are transferred (52) to the server and processed into the same video group. As described later, this grouping of videos can then be used to provide target motions for comparison directly with subject video(s) or subject 3D model (or vice versa).

Multiple Motion

Figure 4:
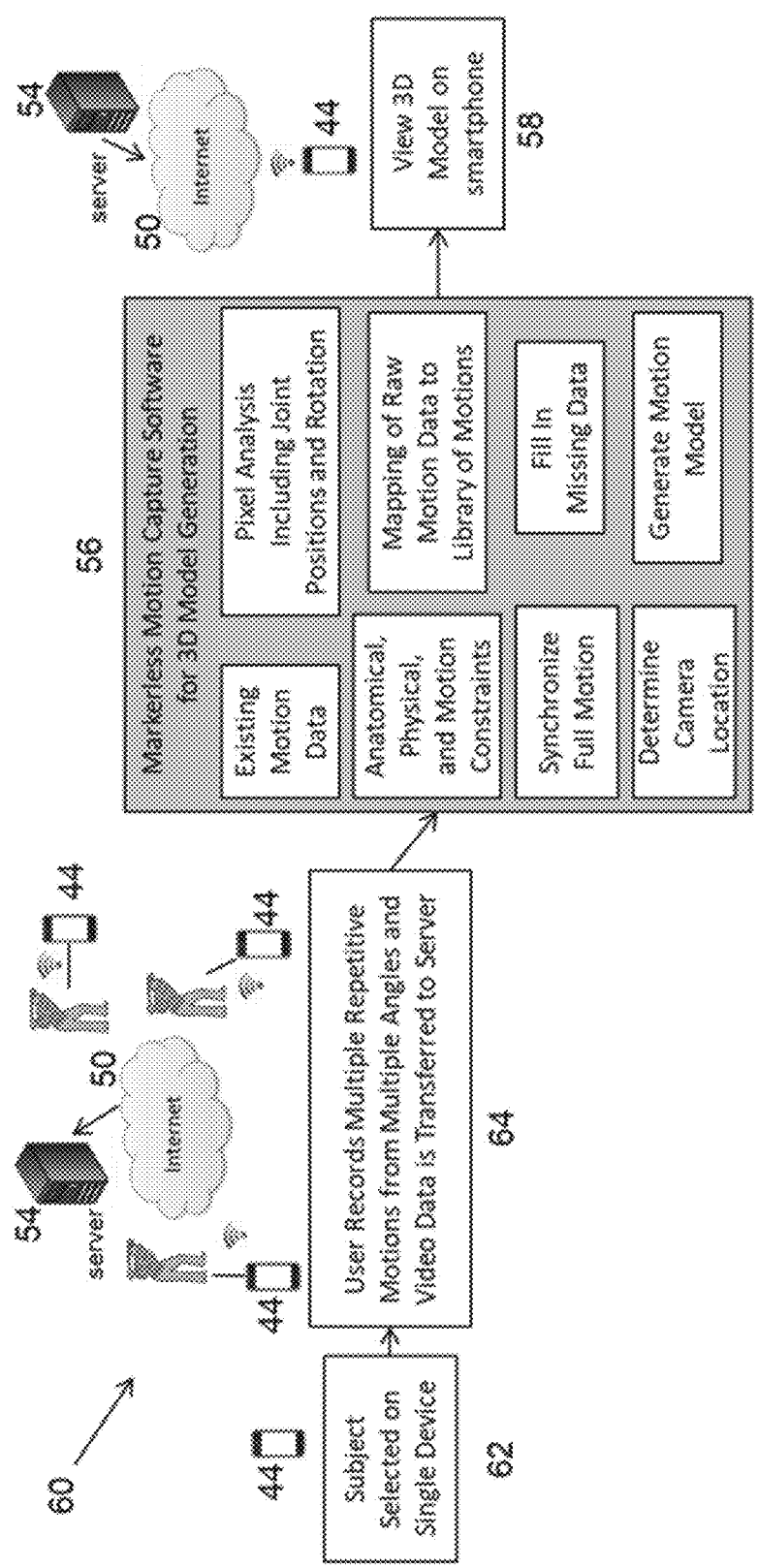
FIG. 4 is a single device process for capturing motion, viewing motion, and generating 3D motion models in accordance with an embodiment of the present technology.

A process 60 for capturing motion data with a single or multiple devices 44 that record videos of separate repetitive motions from different viewpoints and processes the data into 3D models in accordance with an embodiment of the present technology is illustrated in FIG. 4. In one configuration, the application is opened on a single device 44 and the subject being videoed is selected (62). The user records (or uploads) (64) multiple repetitive motions from multiple angles and video data is transferred to the server 54, as selected by the user. Data is transferred to the server 54 by a wireless connection to the Internet 50. The user may view the videos prior to including as part of the 3D generation and choose to generate the model. Markerless motion capture software for 3D model generation (56) is used to develop a 3D model of the motion. When complete, 3D model data is transferred from the server 54 through the Internet 50 and then through wired or wireless connection to the device 44 so that users can view (58) the 3D model on the device 44.

For processes 42 and 60, the time for the application to process the data to develop the model depends on computing power, data intensiveness, and bandwidth for data transmission. A variety of other configurations can be used to provide similar results including, but not limited to, use of other devices, wired communication, and local, instead of distributed processing. Similarly, alternate markerless motion capture techniques may be implemented. Additionally, videos may be from a variety of sources including but not limited to those described in FIG. 4 and FIG. 5, available televised video images, and videos posted online.

In a 2D embodiment, the process can end after videos are transferred (64) to the server and processed into the same video group. As described later, this grouping of videos can then be used to provide target motions for comparison directly with subject video(s) or subject 3D model (or vice versa).

Process with Optional Manual Alignment

Figure 5:
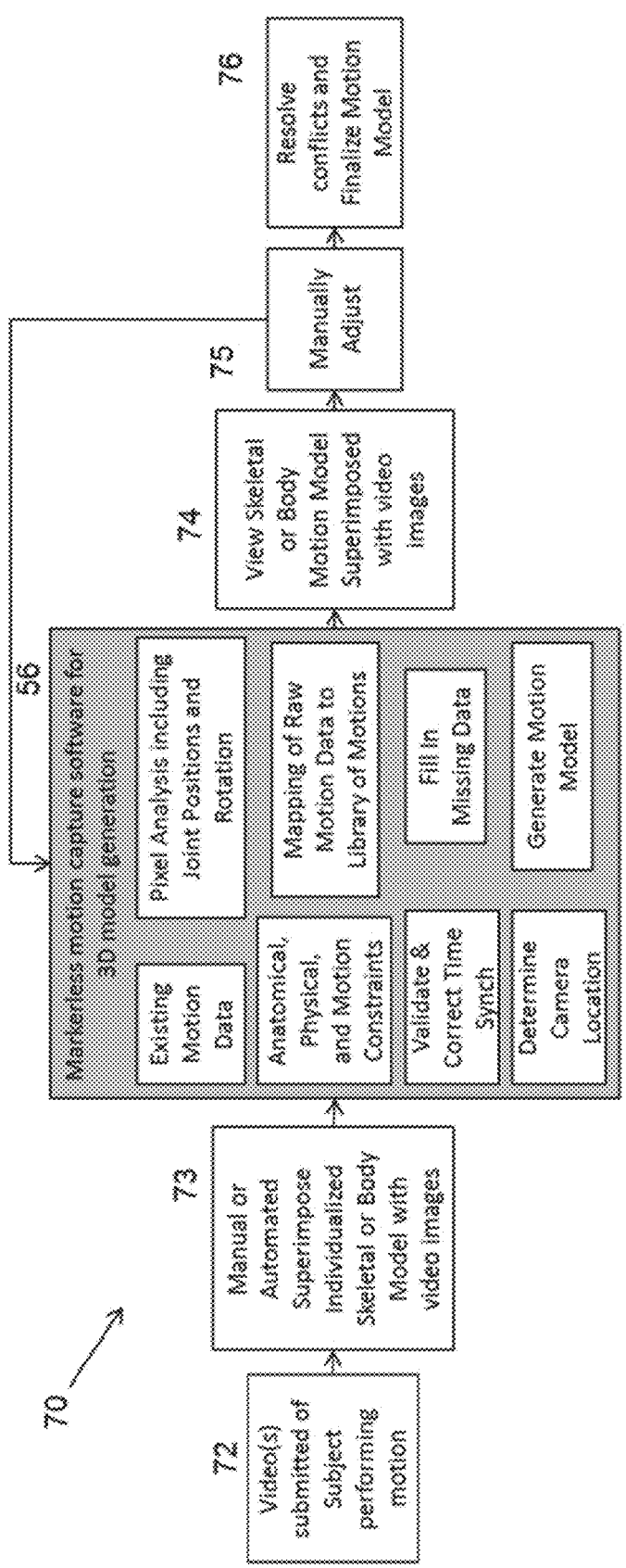
FIG. 5 is a process flow for developing motion data with viewing of and optional manual alignment of skeletal and/or body models superimposed with video images in accordance with an embodiment of the present technology.

FIG. 5 shows a process 70 for developing motion data with viewing of and optional manual alignment of skeletal and/or body models superimposed with video images. Video(s) are submitted of a subject performing the desired motion to be modeled (72). Videos may be from a variety of sources including but not limited to those described in FIG. 4 and FIG. 5, available televised video images, and videos posted online. Videos may be in slow motion or at native pace. If desired to model the pace, the rate of slow motion video or a full speed video is provided. There may be a single video of a single event, multiple videos of the same event, or multiple videos of different events of a similar motion (e.g., videos of different jump shots from different angles). Manual or automated methods are used to superimpose and synchronize the individualized skeletal or body model (e.g., from process 4) onto the subject in a single or more frames of the video (73).

With the skeletal or body model aligned with the image, markerless motion capture software techniques may be used to automate the generation of a 3D motion model (56) by synchronizing the skeletal model movement to the motion of the subject in the video. In one embodiment, skeletal segments are mapped to pixel data for key points including joint position (e.g., spine bones to pixels associated with number on jersey, feet to pixels associated with pixel data on shoes, knee to pixel data on outline of knee, etc.) and rotation, such that the skeletal model follows the motion automatically.

Figure 6:
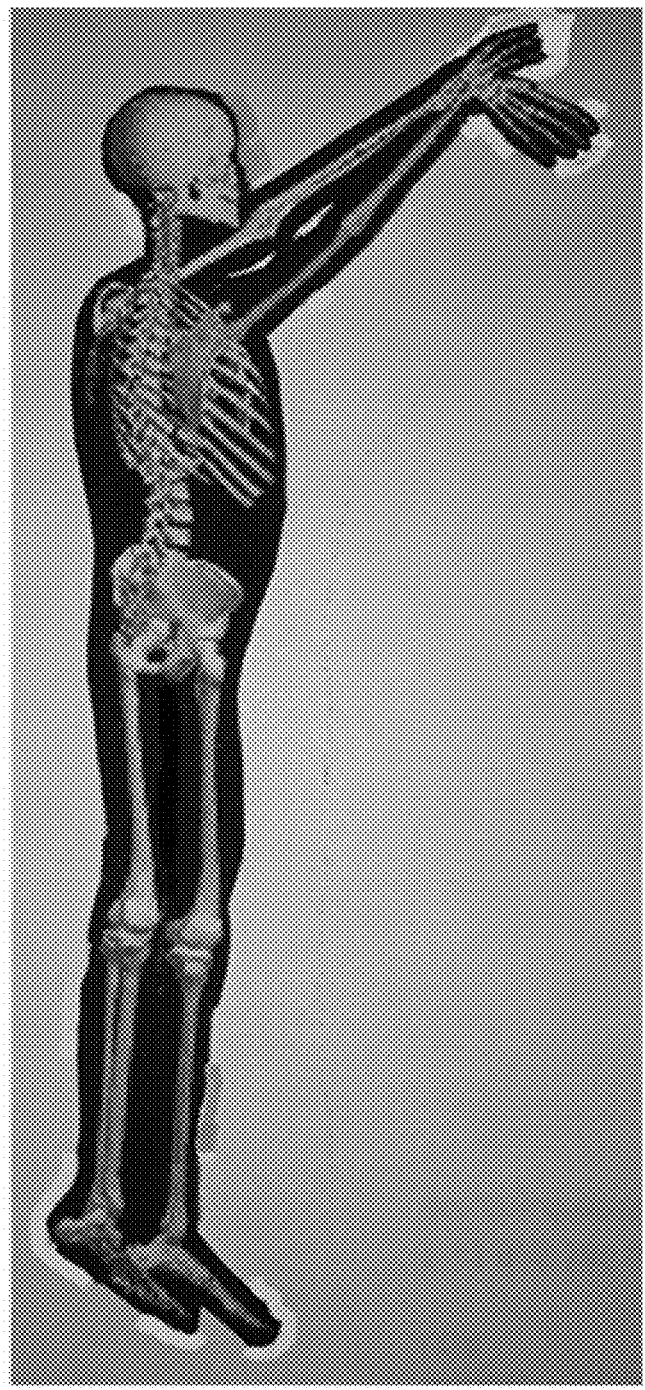
FIG. 6 is a drawing depicting a skeletal model superimposed onto a video image in accordance with an embodiment of the present technology.

The skeletal or body motion model can be viewed superimposed with the video images (74). As necessary, the skeletal or body model can be adjusted manually (with controls such as mouse click, touch screen, or keyboard keys, using zoom features) to better align the video image on a single or more image(s) (75). With the improved alignment of the skeletal or body model to the video, the process (56) and (74) can be repeated for any or all video images. FIG. 6 shows a depiction of a skeletal model superimposed onto a video image after releasing a jump shot in accordance with an embodiment of the present technology. When the alignment of skeletal or body motion model over the video images is acceptable, the video is finalized after resolving any conflicts among the video images using techniques including, but not limited to weighted averaging and prioritization (26).

Single Video Device Fixed Position

In addition, a single video optics device can be used to assess a given position held fixed by the subject (e.g., starting position, or other position during the motion). The person operating the device records the fixed position by walking around the subject for a segment, or entirely. A variety of methods may be used to identify the camera location including using methods described in process 110 depicted in FIG. 9.

Video Synchronization

Instead or, or in addition to, using the server-based time synchronization described previously, there are various other methods of synchronization that may be used including, but not limited to using the sound of the motion where applicable (e.g., ball contact, feet hitting ground, etc.) and using the motion itself (e.g., first movement, transition points, height from the ground) to synchronize the videos. Where repetitive motions are used to provide motion data, because there may be a different pace associated with different execution of the motions, each set of motion data is synchronized throughout the motion, such that there is a single synchronized pace associated with the motion data. Additionally, position conflicts are resolved among the video images using techniques including, but not limited to weighted averaging and prioritization. The conflict resolution requirements will generally be greater when processing separate instances of the motion (e.g., successive golf swings). The system allows user input on conflict resolution, if desired. Alternatively, the user may perform the synchronization by identifying equivalent positions of multiple videos on the user interface of the device.

Video Data Transfer

There are various other methods of transferring the target video into the system for use that include, but are not limited to e-mail or traditional upload based approaches from any computer based system.

Stand Alone System

A stand-alone system (i.e., not a server based system) is provided that may incorporate wired or wireless communicating devices.

Determination of Camera Location for Model Development

When the video optics location is not known, the location of the video optics can be determined through methods such as best fit to the initial position for the motion based on known body measurements and/or best fit throughout execution of the motion. With known body segment lengths, the location of the camera can be estimated with dimensioning techniques based on geometry. Alternatively, or additionally, the camera position (i.e., angle and zoom) can be estimated from other known dimensions in the video (e.g., basketball court lines). In some cases, the camera position is relatively fixed, but the camera angle and level of zoom vary over the course of the video, so the camera position for motion modeling is adjusted over the course of the video images (e.g., jump shot video generally will move to follow the ball and sometimes zoom in or out during the recorded motion). Similarly, the location of a target (e.g., basketball hoop location) can be estimated from the motion of an object (e.g., ball) or based on known court dimensions. Further, the smartphone or tablet has known camera operation that allows estimation of the size and distance of objects. Further, these devices often include sensors such as an accelerometer(s), gyroscope, magnetometer, and gravity sensor that allow both camera angle and motion of the camera to be estimated.

Fill in Missing Data

The accuracy of the model generated is a function of the number video optics devices, type of video optics (e.g., standard or 3D), variety of angles, and quality of video. Where less data is provided, for example from a single non-3D video optics device, 3D representation is obtained by including existing 3D model data in the generation. If multiple video optics devices are used, filling in data with an existing model is more limited or may not be required.

Known characteristics of a motion or other techniques are used to fill in missing data. In one embodiment, raw motion data is mapped to library of motions and existing motion data is used to fill in missing data. The library of motion database contains common motion characteristic for a given motion by analyzing available data to determine common characteristics for that motion. The expected motion data for a subject can be customized for specifics of the subject such as body/skeletal type and gender. Missing motion data can be applied by extracting existing motion data from the subject or a base motion model can be applied to fill in missing data. Additionally, or alternatively; the type of motion can be specified by the user.

Known Skeletal or Body Model

Anatomical, physical, and motion constraints are applied. With known joint articulation possibilities and constraints for the type of subject (e.g., human) being analyzed provides additional data to support more accurate motion modeling. The present technology can customize body and/or skeletal models to match the subject's specific body features (e.g., muscular, skinny, overweight, amputee, double jointed, etc.) through manual input or automated techniques (e.g., assessing movement in video, moving through directed flexibility motions).

Update Skeletal or Body Model

Additionally, the present technology can update the skeletal and body models where the video data shows a conflict with the existing model, thereby improving the skeletal and/or body model. Further, the skeletal and body models can be developed from the same video/images used from the motion modeling simultaneously or in varying order (e.g., base motion model is developed and then skeletal model is developed).

Developing Alternative Target Models

The present technology can allow the development of multiple target models by weighting target models and/or applying typical adjustment to base models to provide a full range of target motions. For example, a targets models developed from an expert using a 4 iron and a 6 iron are averaged to develop a target model for a 5 iron. Similar approaches can be applied to develop target models for all typical golf clubs, even though they vary in length.

3. Target Motion Selection

Figure 7:
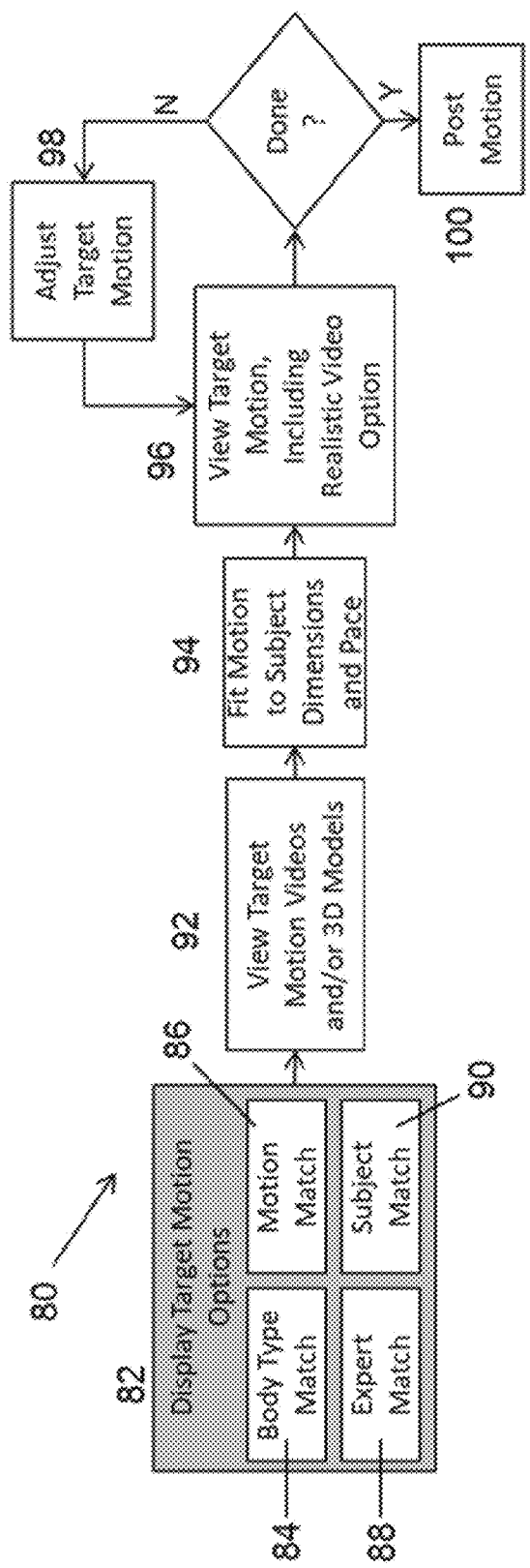
FIG. 7 is a process flow for identifying and developing target 3D motions in accordance with an embodiment of the present technology.

A useful feature of the present technology is the ability of a user to select and develop a target motion that is customized for the subject's body dimensions. Several tools are provided to help the user to create an appropriate target motion. Motion data used for developing a customized target motion includes, but is not limited to, actual expert video footage, models derived from this video, variations of expert models that have been manually or arithmetically adjusted, models generated by other users, and models developed based on physics or other approaches, such as using the common characteristics of the best performers at the specific motion. After a model is selected, a subject specific target model can be generated by adjusting the model to maintain the key attributes of the motion, but to customize specifically for the subject's dimensions. The pace of the motion can also be adjusted to match the subject's expected pace, as desired. Constraints of the specific application are also factored into this adjustment (e.g., club length, but can be modified by the user, if applicable). Subject physical attributes (e.g., flexibility) are also factored into the target model generation. This is unique and valuable functionality, as comparing a subject motion with a target model that reasonably matches the subject's body greatly improves the ability to compare actual and target motions. A process 80 for identifying and developing 3D motions in accordance with an embodiment of the present technology is illustrated in FIG. 7.

To help users identify and select target motions, the system displays (82) target motion options that may include body type match (84), motion match (86), expert match (88) and subject match 90 that are described below. In each case, the user can view (92) target motion videos and 3D models for target motions that are stored in a motion data repository.

Body Type Match

For established motions, users can select body type match (84) to develop a target motion based on the subject's body measurements. In one embodiment, the subject's body type is compared with target motions based on body type to select one or more options for target motions. For example, in the golf swing application, experts with similar body types are identified, so that their swings can be viewed and selected. Additionally, generic model swings can be provided including established known swing types, such as a model "one-plane" target motion and a "two-plane" target motion, that can be displayed specifically fit to the body type.

Motion Match (and Body Type, if Desired)

The user can select motion match 86 to use recorded motion data to identify which target motions resemble the subject motion and/or identify experts that have a similar motion to the subject. It is often desirable to find experts with a similar motion, so that a subject can more closely maintain his or her natural motion as he or she works to improve. There are a variety of techniques that can be used to assess the level of fit between two motions. For example, least squares can be used to compare key points of the subject motion and the target motion that is adjusted for the subject's body dimensions. In another example, key characteristics of the motion for a given activity are measured for both target and subject motions. These measures are then used to identify motions with the best fit. For example, in golf, key characteristics may include, but are not be limited to, stance angle (bent over, athletic, or upright), swing plane angle (measured in degrees), position of club at the top (closed, open, or square), grip (strong, neutral, or weak), arm position relative to body (one plane vs two plane), and/or degree of wrist cock. If desired, the subject can also select both body type and swing type to be factored into the calculation to find potential target motion matches.

Expert Match

The user can select expert match 88 to choose from a list of experts for target motion development.

Subject Match

The user can select subject match 90 from the subject's recorded motions to identify model swings that he or she wants to use as target motions. This allows the user to capture the subject motion at peak performance to help replicate and maintain this performance, or, for example, use a motion identified during a lesson with a professional instructor.

4. Fit Target Model to Subject Dimensions and Pace

For a selected target motion, the user can fit (94) motion data to the subject's dimensions and pace. This subject specific model is useful for comparison of actual versus target for executed motions and training; both of which are described later. There are a variety of techniques that can be used to fit a subject's dimension to a target motion. In one embodiment, the subject's body segments replace the target's body segments, thereby changing the location of key points. However, the relative movements of those points are consistent with the target motion (e.g., body part movement sequence, angles of movement, etc.). In some cases, there are conflicts that require resolution. For example, in golf, a subject's body fit to a target model may result in a club that is not the same length and therefore does not contact the ground at the desired location. In this case, the user could choose to use a different length club or choose from options to resolve the difference (e.g., add knee bend, add waist bend, etc.). The conflict resolution options vary based on the nature of the motion. For example, for a jump shot, the subject may have a different vertical leap than an expert used for the target motion. In this case, the jump shot release may be configured to be at the same point relative to the peak of the jump as the expert. Further, the pace of movement can be adjusted to be consistent with the subject's capabilities. Anticipated results from the target motion are also presented, where applicable. Subject physical attributes (e.g., flexibility) are also factored into the target model generation. For example, a subject that is less flexible than the target motion from a professional golfer results in a shorter swing (i.e., motion does not move back as far). In the case where subject match 90 is used as the target motion, fitting the target model to the subject's dimensions is not required.

5. 3D Viewing of Target Motion, Including Realistic Video Option

The user can then view (96) the target motion, including the ability to view a realistic video of the subject performing a target motion. Expert target motions are presented with both the native expert body dimensions (i.e., modeled as Tiger Woods) and expert motion adjusted to fit the subject's dimensions (i.e., Tiger Woods' motion adjusted to the subject body dimensions). Items associated with the activity are included (e.g., golf club, tennis racquet, skis, etc.) in the model where desirable. In addition to presenting 3D models at the body and skeletal level, the subject can view on a display a representative video of himself or herself performing a target motion from a variety of viewpoints. This is accomplished by merging data from the subject's motion and that from the target motion. In one embodiment, the pixel data of the subject's motion video is mapped to target motion model. The skeletal data is adjusted to match the target model and the pixel data is then adjusted to match the new skeletal data. The result manipulates the video to show a representation of the subject performing the target motion, with an accuracy that can range from recognizable to accurate depending on the level of manipulation required. Additionally, the user can view the motion and/or show comparisons from the perspective of the subject performing the motion (i.e., as the eyes of the subject would view while conducting the motion).

6. Target Motion Adjustment

The user can adjust (98) target motions through algorithms or manually. Algorithmic approaches include, but are not limited to combining motions where the user defines weighting among motions and selecting different aspects of motions to combine (e.g., subject backswing, but an expert downswing). Manual adjustment can be performed using similar functionality to that currently used in animation, where the user can manipulate points to adjust the motion. Timing of different points of the motion can also be adjusted.

7. Post Target Motion

Once complete, the user can post (100) a motion, which saves the data to the motion data repository. The user can choose to use this motion data for the subject, and/or to make the data available to others.

8. A 2D Embodiment of Target Motion Creation

Figure 8:
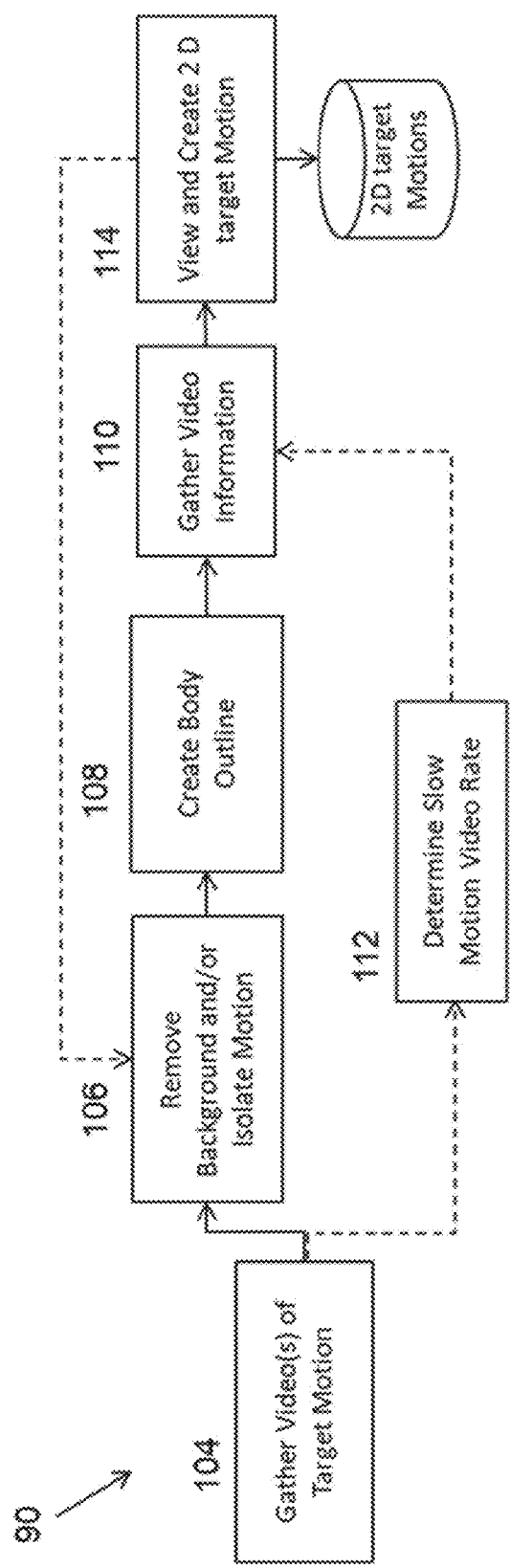
FIG. 8 is a process flow for creating 2D target motions in accordance with an embodiment of the present technology.

In addition to 3D model creation, the present technology allows for the development of 2D target motion videos from videos of experts (or other people desired to demonstrate). This can be an individual video or more than one video from different angles of the motion that are grouped. FIG. 8 provides an overview of a 2D process for preparing target motions for motion improvement in accordance with an embodiment of the present technology. The process 90 commences with gathering a video(s) of a target motion being performed (104). The video(s) may be either in real-time speed and/or slow motion. The speed of the uploaded video (e.g., frames per second) can be obtained from the video information files, entered by the user, or if both real-time speed and slow-motion recordings are provided (within one video or with 2 separate videos), the system can estimate the rate of the slow-motion video relative to real-time, by setting equivalent points in the 2 videos and comparing the elapsed time between the 2 equivalent points (112). This information allows speeding up of a processed target motion from slow-motion video to be played in real-time, if desired. In varying order depending on the specific scenario, using video processing techniques (e.g., erasing, drawing, adding negative images, rotoscoping), the target motion is isolated by one of or a combination of background elimination and motion isolation (e.g., through Machine Learning techniques) (106). To provide an additional view to improve subsequent comparison, the remaining motion is converted to an outline where the edges of the objects in the remaining images are shown, but the main body of objects are transparent (108) (e.g., by finding edges followed by and color keying to make the body transparent). The video processing (106 and 108) may include both automated processing, as well as software tools to prepare a target motion, as well as include objects that the user would like to include (e.g., balance beam for gymnastics may not move in the video, but the user may want to include in the target motion). The user can enter information about the video, such as the category of target motion (e.g., golf swing), details on the motion (e.g., 8 iron down-the-line), information on the target used (e.g., Tiger Woods), pace of the slow-motion video relative to real-time speed, among others (110). The user can view and revise the target motion, if desired. In this embodiment, the user views and saves the target motion to a database (114). Saved data may include video data from the original video, the isolated target motion, and/or the isolated target motion showing outline only. This target motion data can then be used by the user and/or accessed by others for comparison with a subject performing the motion.

9. Adding Person from One Video onto Another Video

Figure 9:
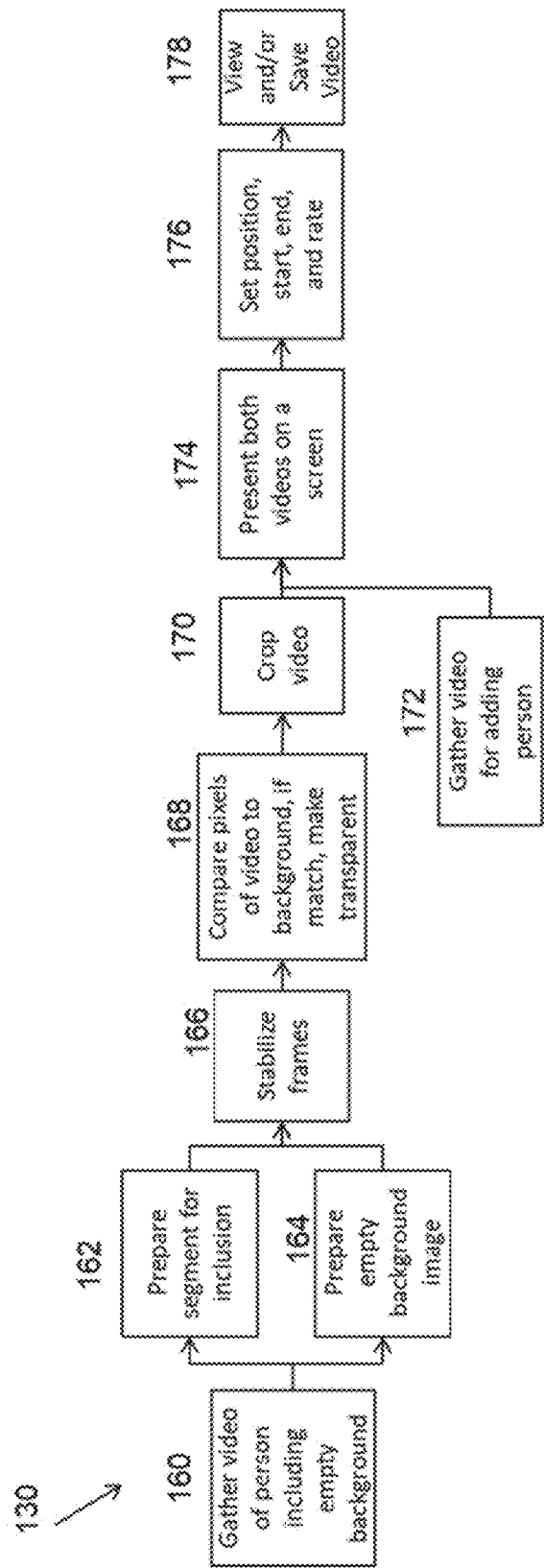
FIG. 9 is a process flow for placing a person into another video in accordance with an embodiment of the present technology.

FIG. 9 provides an embodiment of a process for adding a person (or other object or being) from one video into another video. The process 130 begins with gathering (160) a video with a person to be added to another video that includes an image of the background without the person in it. The video is prepared into a video of the segment of interest with the person (162) and an image or short clip of the empty background (164) without the person in it. In varying order, the frames of the video are stabilized (166), the pixels of the two aligned videos are compared and if a pixels match is within a tolerance, then the pixels are made transparent (168), if needed, the video is cropped to exclude area not including the person (170). The user gathers the video to add the person (172) and the transparent background video is placed on a top layer of the screen. The start point, end point, positioning and, optionally, the rate of the transparent background video is set (176). The videos can then be viewed and/or saved as a single video (178).

10. Crowdsourcing for Motion Data

The present technology can allow the development of a vast array of target videos and motions. Users can define new categories and develop 2D motion isolation/transparent background target motions and/or skeletal/body models and motion models for a variety of individuals and motions, including experts in a selected area and make these models available for others to use. Further, users can improve on existing motions developed by themselves or others by selecting and processing additional photos or video for the individual in the motion. 2D motions and 3D motion models developed from video of experts are desired target motions for users.

11. Comparison Between Subject Motion and Target Motion

In the present technology, the subject's motion in a subject video and the target's motion in a target video motion can be provided simultaneously as a video combination on the same screen. In some implementations, the subject video and the target video can be provided as an overlay on the other. In some implementations, the subject video and target video can be sized and moved independently for optimal viewing.

Figure 10:
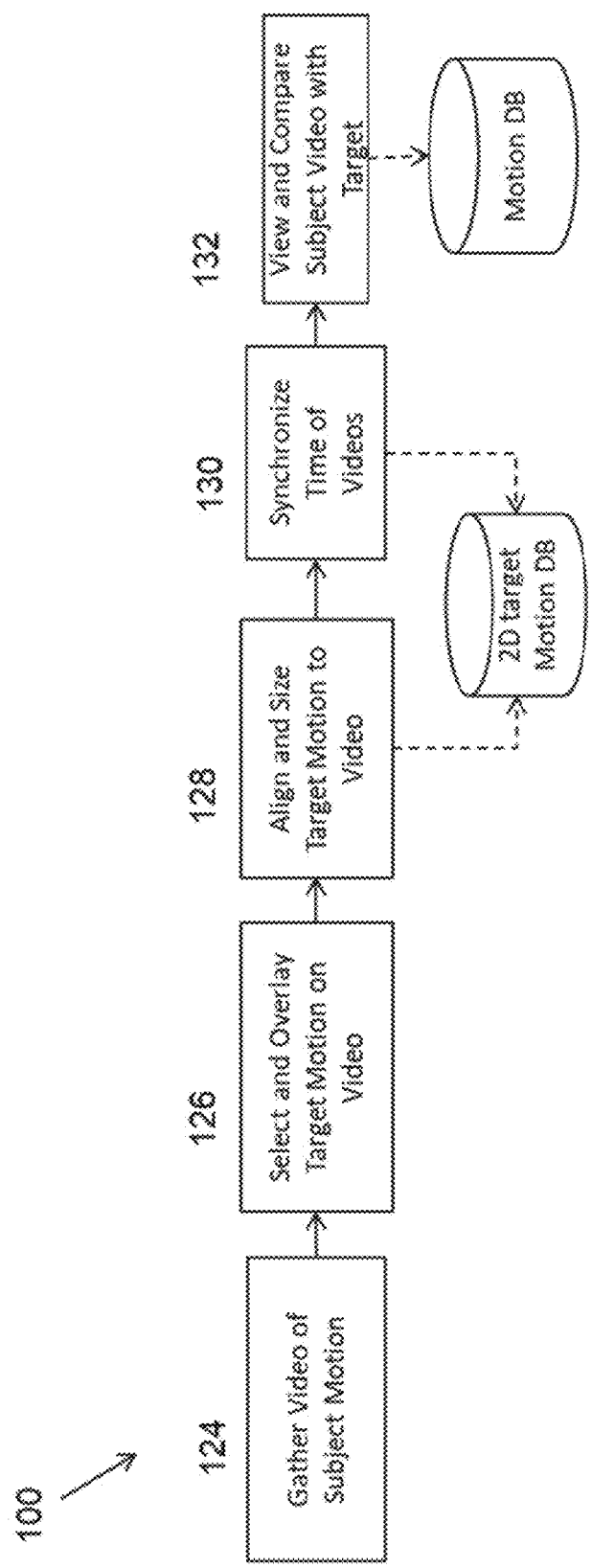
FIG. 10 is a process flow for gathering a subject video, overlaying the target video, aligning and synchronizing motions, and viewing/comparing motions in accordance with an embodiment of the present technology.

FIG. 10 provides an overview of a 2D comparison of a subject video from a subject with a target video from process 90. The process 100 commences with recording a video of a subject performing a motion (124). In this embodiment, the user has not yet selected a target motion for this activity and the user selects the desired target video. The target video is overlaid on top of the motion in the subject video (126). Using tools such as touch screen, mouse click, or keyboard keys and/or automated techniques, the motions are sized, rotated, and moved such that spatial aspects of the target and subject videos align. Spatial aspects of a video can be, for example, dimensions of the entire video, dimensions of a portion of the video (e.g. a portion corresponding to an identified object), orientation or rotation of the video, or other visual aspects of the video. The spatial adjustments can be proportional or non-proportional (e.g., to make the target taller or wider) (128). The videos are then synchronized using techniques such as time mapping to have the target and subject motions synchronized throughout the motion being performed (130) such that the target and subject motion are synchronized as desired during playback of the video combination. The remapping of the time and spatial adjustments may be on one or both the target and subject video. In some implementations, the adjustments can be saved for subsequent use by the same user or provided for use by other users.

In another embodiment, the subject video (instead of the target video) is prepared in a similar process for overlay onto the target video (instead of the subject video).

A 2D Video Example

In a 2D video example, with the target motion video with transparent background placed above the subject video layer, the person (or other object) performing the target motion is effectively added to the subject video. Using smartphone sizing and movement approaches, the subject video can be sized and moved as desired and the target can be sized to match the subject and moved to any preferred location on the screen for comparison. Different views of the motion on the top layer are provided, such as transparent outline/edges views. A normal view is useful to overlay and see some differences but blocks the view of the subject. The user can then move the target motion such that they are side-by-side or select a view where outline or edges are shown, but the body area of the target is largely transparent. This is particularly useful for a direct overlay with the subject.

A 2D Video Example: User Creates Target Videos

In some implementations, video combinations can be created on a users local system or through interactions with one or more servers e.g. in a cloud environment. In some implementations, a target video can be obtained, locally or on a server, that include two videos of an expert performing a target motion (e.g., golf swing with driver) from different camera positions (e.g., behind the golfer for a down-the-line view and facing the golfer for a face-on view). These views of the target video can be in a single file or multiple files. In a cloud environment, the target videos can be provided to one or more servers which perform operations such as spatial adjustments and time synchronization of the videos. Additional operations can also occur, such as stabilizing the video (if necessary), removing the background or making the background transparent, cropping the video to include only the area of interest, or saving the videos as two views of a target motion.

A 2D Video Example: Matching Camera Location Including Semi-Automated Approach

To increase the effectiveness of video comparisons, camera positioning information can be included with target videos and guidance can be provided for the capturing of subject videos improving the level of camera position similarity with the target video. In some cases, a provided target video may not include camera location data. However, manual and automated techniques can be used to identify the location of the camera for providing guidance in capturing the subject video. In a manual process, the user moves the camera until the starting position of the target is lined up with where the starting position of the subject is/will be. Once located for a target motion, this camera location can be saved numerically or in a map for others to help locate this position in the future. There may be multiple distances where the camera position works effectively as long as reasonably on the same line at the camera was pointing when the target video was recorded. Gathering multiple effective positions can provide additional detail of the line and angle of the camera used for a given target motion video.

Figure 11:
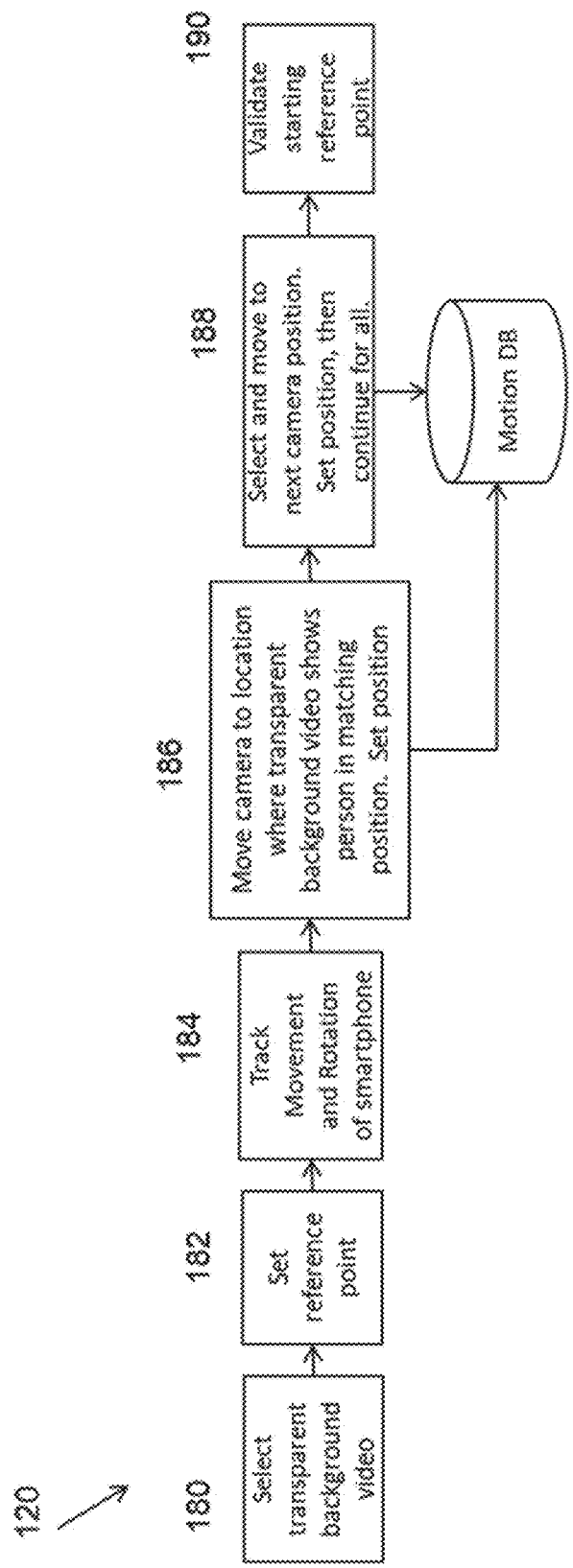
FIG. 11 is a process flow for gathering and storing camera location for target videos in accordance with an embodiment of the present technology.
Figure 12D:
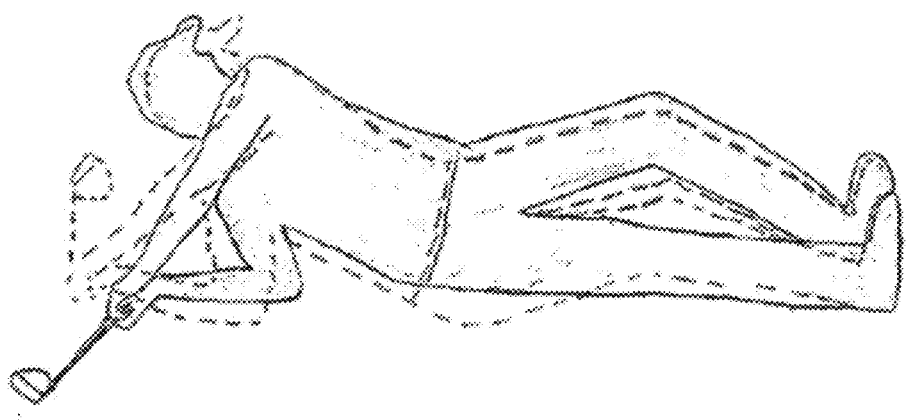
FIG. 12 is a drawing depicting a target motion, target motion adjusted to subject, subject motion, and target motion and subject motion superimposed in accordance with an embodiment of the present technology.
Figure 12C:
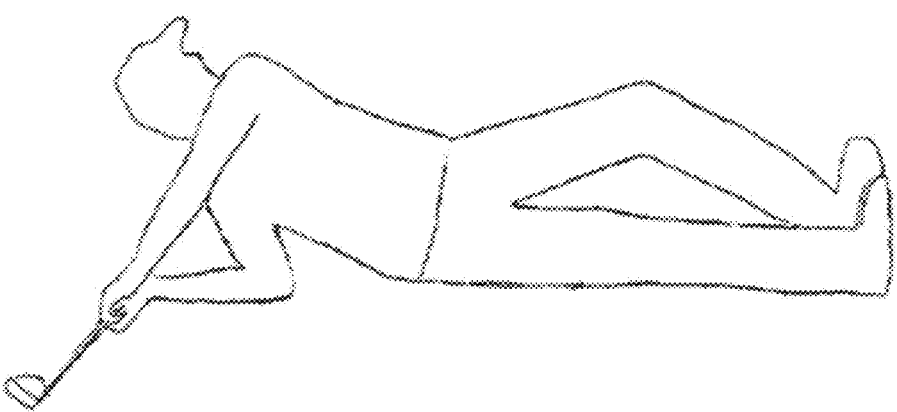
Figure 12B:
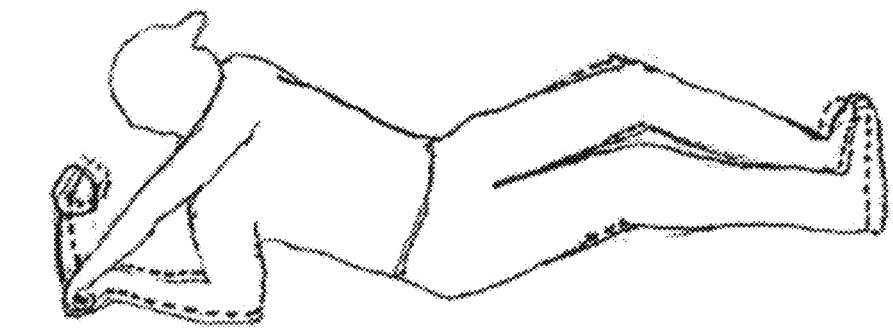
Figure 12A:
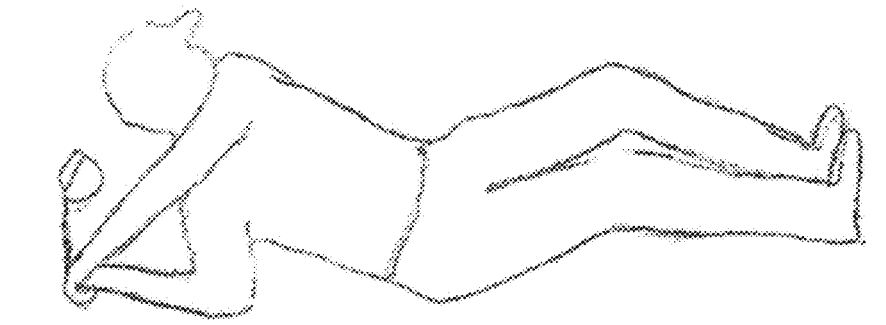

In this case, the user moves the camera and records videos until good camera locations are determined for comparison for both target motion video views. The user then uses a semi-automated process using a reference point to save this position. FIG. 11 provides an embodiment of a process for gathering and storing acceptable camera locations for target motions. A similar process can be used to store the camera position when first recording target videos. The process 120 begins with selection of a target motion (180) and the user then sets a reference point (182). In this case, the camera is held horizontally with an on screen display for locating the golf ball and an arrow indicating direction the shot will be aimed. The height of the smartphone is determined from the size of the golf ball on the standard viewing screen for the smartphone, but other techniques to determine the distance from the ball or ground may be used. Alternatively, a subject in the camera viewer or other object could be a reference point. The user then sets this reference point (182). The sensors (e.g., gyroscope and accelerometer) in the smartphone are used to track the movement and rotation of the camera (184). The user moves to a location that reasonably matches the camera position used for the first target video and with the target motion for that location on that screen showing that this is a good position sets this location in the system (186). The user may then store the data for the next camera position in the same way or move directly to the next camera position from the first position and set this position (188). Optionally, after setting the location of the second camera view (e.g., after any point or final point in a generic example), the user can move the smartphone back to the reference point (190) view to validate positioning of the reference point, thereby providing additional data for processing or notifying the user to redo if a misalignment. In some implementations, the data provided from the smartphone sensors can be provided as camera, location data, e.g., which can be provided in association with a target video to a server.

With the camera positions saved for target videos, the system can now direct users of this target motion to these specific locations and/or the vector matching the camera view to allow users to quickly and easily find acceptable camera positions for good comparison with target motions. There are various methods to direct users to these locations with mapping, arrows, alignment boxes, lines, and other on-screen or verbal prompts. If a new user doesn't agree with the camera position or finds and alternate that works better, the system allows for additional camera positions to be stored.

A 2D Video Example: Setting Camera Position and Recording Video

In some implementations, the system has previously obtained target videos with associated camera position information. A user can select such a target and can set a reference point for locating the camera. For example, in a golf setting the user can hold the camera horizontally above the ball, match the size of golf ball and direction of aim in the viewer, and can move the camera in the general direction of the down-the-line view. In some implementations, the user can accomplish this by following on-screen prompts to place the camera/tripod in a location that reasonably matches the target video location. Optionally, the user moves and sizes the person in the target video to be in the same position as he will be when swinging the club (in some embodiments, the image of the person in the target video is sized and placed automatically in the location matching the starting position) to validate the position. In the golf example, the user can select slow-motion or regular-motion, press record, perform the swing, and return to the camera to stop the recording. The user then moves the smartphone to the face-on view, using methods previously described, and records a swing that is attempted to be identical from the same starting position. Alternatively, separate cameras could have recorded the first swing from multiple views at the same time. Where multiple views are desired, a combination of multiple cameras and/or multiple views can be used to match each available target motion.

A 2D Video Example: Synchronizing Videos

In some implementations, the system can play the target motion and the subject motion at their relative native pace from the same starting point in time. The system allows the user to play, pause, and scroll each motion independently, thereby allowing the motions to be manually placed in a similar position for comparison. However, the present technology can also provide further synchronization techniques. Specifically, the target video and subject video can be time-synchronized such that each reach the same points at approximately the same time throughout the motion. For example, the system can adjust playback of one or more segments of the target video or of the subject video such that at synchronization points in the target video are displayed at the same time as corresponding synchronization points in the subject video during playback. In some embodiments, the system or the user can trim one or both of the subject or target videos to have the same start and end points as the other video. For example, golf subject and target videos can be trimmed to both start right before a club is moved and to both end right after completing the follow-through. In some implementations, one or more cameras can capture a user performing multiple iterations of a motion in a single video. This allows the user to focus on the movements with limited interaction with the camera or other equipment. The system can automatically identify the start and end point for each iteration of the motion using motion analysis, sound cues, object identification, a trained machine learning model, etc. in a similar manner as can be performed for trimming the video. In some implementations, each iteration can be saved to a separate file. For example, a golfer can setup a camera and have it record the user performing several swings of a club. The system can identify the individual swings and save each as a separate subject video. The user could then setup a video combination with a target video and each of the subject videos. Using a control, the user could easily flip through the series of movements, seeing how each compared to the expert and where variances tended to arise.

For time-synchronization, the rate that the target motion video is played is adjusted such that the subject motion and the target motion videos begin and end at the same time (i.e., these 2 synch points are set). Now the user can view the two videos playing simultaneously. Because the videos have been trimmed with the same start and end points, if the subject video has the same pace throughout the swing as the target, then the swings will be synched throughout. However, the pace of the subject and target may vary, so without further synchronization the swings would be out of synch for comparison for at least portions of the swing. The system allows for synchronization points to get set throughout the motion. In this case, synchronization points can be set wherein each synchronization point corresponds to a match between a motion in the target video and a motion in the subject video. In some implementations, the synchronization points can be set by a user, e.g., by selecting corresponding points or by adjusting both the target and subject motions so that they are at the same point of the golf swing at several locations and actuating a synchronization point creation control. In various implementations, synchronization points can be set automatically based on one or more of: automatic selection of points where a location of an identified object in the target video matches a location of a corresponding identified object in the subject video; automatic selection of points where a motion identified in the target video matches a motion identified object in the subject video; automatic selection of points where a location of sounds from the target video matches sounds from the subject video; automatic selection of points by a machine learning model that was trained using a set of training videos corresponding to the target category with marked synchronization points; or a combination thereof. Once synchronization points have been set, the system can adjust playback of one or more segments of the target video or of the subject video such that at least some of the synchronization points in the target video are displayed during playback at the same time as corresponding synchronization points in the subject video. For example, the system can adjust the rate of the target golf swing to play such that they meet at the synchronization point (e.g., if it takes subject half as long to reach point B from point A, then the target motion is played at half speed between point A and point B). The user can view the videos playing with synchronization points set and add additional points to meet the level of precision desired.

In some embodiments, markerless motion capture techniques are used to aid in synchronizing videos. First movement, last movement, position of body, position of club, can be identified and input provided to adjust the target motion (or subject motion) to match the positions on both videos.

Additionally, synchronizing on sounds, such as the sound of a club hitting a ball, can provide another synchronization point.

A 2D Video Example: Viewing and Analyzing

A video combination can be created from the synchronized target and subject videos. For example, playback of a video combination of a golf swing can show the subject swing and target swing reaching similar points at similar times throughout the swing. The subject motion and target motion can be aligned and sized independently or locked so that they are moved or zoomed together. Either of the videos can be further modified to create a version with just an outline or edges of the target or subject displayed, allowing an overlay where the user can see both overlaid videos simultaneously by virtue of at least one being partially transparent. The user can now easily visually identify differences between the subject motion and target motion. The user can also view the subject and target motion from a different angle. Where alternate angles where recorded of the same swing from different cameras, the synchronization of the swing matches for all angles. If a separate swing was used, some adjustments may be needed.

In some implementations, the user can analyze the subject motion by comparing positioning versus the synchronized target motion from the down-the-line view. The user can then switch to the face-on view of both the subject and target videos. Where different subject or target videos were taken from different angles, synchronization is maintained for each view. The user can then analyze her motions, e.g. to identify differences from an expert and to identify adjustments before continuing the training session.

The system provides a community where the user can seek input from others or share their results and experience working to match a target motion.

Comparing a 2D Video with a 3D Model

In another embodiment, a subject video is compared with a 3D model of he target motion. Having a 3D target model allows the person (or representative view of the person) in the target motion to be viewed from any angle thereby not only providing additional angle detail, but also eliminating the need to match the camera angle. Instead, the system can set one or more spatial reference points (e.g., with camera over golf ball as done previously) or the position of the subject is used to create the one or more reference points using other techniques. With the reference points known, the user can now move to any position and point the camera at the subject. The target model is adjusted and displayed such that the target motion can be overlaid on the subject. As in the 2D example, the target or subject video can be displayed in a version with just an outline or edges provided. While viewing both the target and subject on the camera viewer, the user can provide input (e.g., stand taller, move club out, etc.) for a given position or the view on the smartphone can be displayed on a separate screen that can be seen by the subject (e.g., using AppleTV, lonely screen software provided on Windows, using a virtual reality or augmented reality wearable display, or other approaches to view a screen on another device). When the user moves the phone, the sensors on the smartphone provide data to update the position and aim of the camera and automatically update the 3D model to match. With the subject in the same position, the user can move the camera around the subject and check positions. At any point, the user can record a video of the subject performing a motion, e.g. the golf swing discussed above. With the position of the camera relative to the reference point known, the user can now select any 3D target model to do a comparison verses the video of the subject, as there are no limitation to match camera angle. As discussed above for comparisons, the subject video and the 3D model can be synchronized as needed, e.g. by setting matching synchronization points. The user can analyze one or more angles of videos. This approach can also use a 3D model of the subject swing compared with 2D videos of target motions.

Comparing a 3D Model with a 3D Model

In another embodiment, a 3D model of the subject is compared with a 3D model of the target motion. Using the techniques described previously, the user records multiple views of a subject performing a motion. This data provides input to prepare a 3D model using markerless motion capture techniques. The motion of the subject and target can be viewed at their native pace or with positions synchronized. The user then can compare the subject 3D motion and the target 3D motion from any angle to identify adjustment needed for the subject to more closely match the target. As described earlier, the user can move the target and subject independently to align as desired and select from different views. Automatic synchronization and spatial adjustments can also or alternatively be performed. The user can also zoom the two models together to allow the user to zoom into desired views. In addition to the visual comparison, detailed model data can be provided of the subject vs the target.

Summary 2D and/or 3D views are provided to provide comparison of a subject with a target motion. Embodiments of the system can provide one or more of the following functions to make this comparison effective:

Comparisons are sized, rotated, or otherwise spatially adjusted to match. This can be accomplished through manual or automatic adjustments.

Comparison at the native pace is provided to allow highlighting differences in speed/tempo of the motions relative to each other. However, when the motions are at a different pace, direct comparison of swing mechanics is difficult. Therefore, to properly assess mechanics throughout the motion, the pace of the motions is synchronized throughout the motion. Either the target or the subject can be selected as the master for the motion pace, or both motions can be adjusted.

In one embodiment, the outline of the target motion may be shown on top of the subject motion, or vice versa. Alternatively, the motion that is overlaid on top may be semi-transparent to varying degrees, as desired by the user, to allow both motions to be viewed simultaneously.

The video combination result of combining the subject and target videos and/or motions can be saved in a single video to be viewed later or easily shared with others.

Body and skeletal comparison of the actual motion and the target motion can be provided. The system allows both the body and skeletal data to be adjusted from anywhere between 0% (not present) to 100% (fully present). An example comparison has the subject partially translucent, and the target motion outlined, so that the subject fits inside the outlined target.

In another embodiment, the subject's motion and the target motion are isolated from the background and use techniques such as different colors and patterns to allow differentiation. For example, yellow and blue may be used as colors for body or skeletal data. Where overlap exists within an acceptable range, the color could be green. When outside this range, the yellow and blue colors are shown.

3D viewing tools are used to provide a view from any viewpoint. Zoom in and zoom out functionality can also be provided.

Areas that deviate from the target motion outside of an acceptable range can be highlighted. The amount of deviation that is acceptable can be adjusted. For example, as a subject improves, the acceptable level of deviation may be narrowed. Both visual and audio feedback (e.g. speaker, wireless headset, etc.) of the deviation can be provided.

As appropriate, summary reports of key differences are provided.

Reports or key motion characteristics and how they rate versus the known characteristics of experts in the field are also provided.

FIG. 12 provides a depiction of 2D views of a point in the subject's motion versus an equivalent point in the target motion that has been adjusted for the subject's body in accordance with an embodiment of the present technology. FIG. 12 displays body images, though similar views are provided for skeletal data and direct video comparison. FIG. 12A shows a target motion. FIG. 12B shows the target motion adjusted for the subject's body dimensions. In this case, the target motion and the subject motion have similar body types, but the subject is slightly taller. The dashed lines in this diagram depict the original target motion dimensions. FIG. 12C shows the subject motion at an equivalent point in the backswing. FIG. 12D shows the target motion and the subject motion superimposed, where the dashed lines show the target motion.

Figure 13B:
FIGS. 13A and 13B are pictures showing a target motion overlaid on two subject videos, where the subject has made adjustments to much more closely match the target video.
Figure 13A:
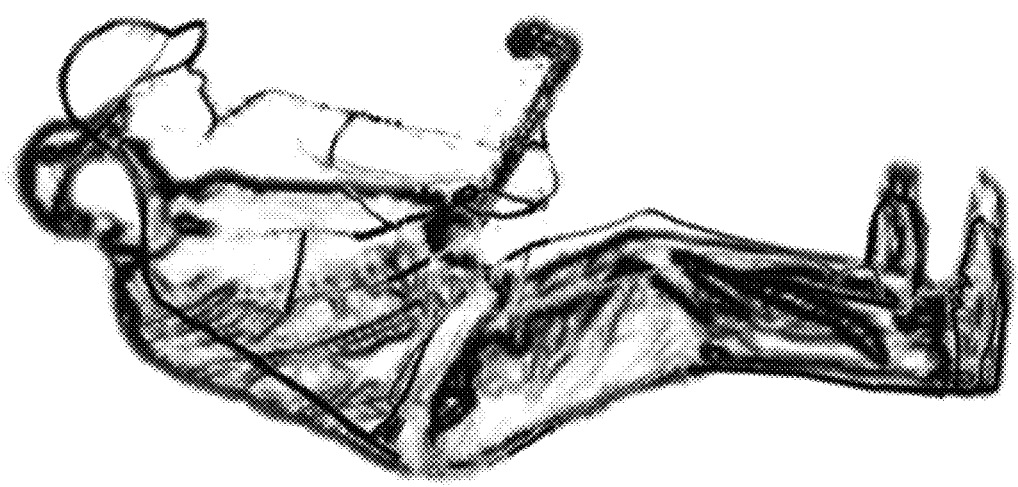

FIGS. 13A and 13B provide depictions of a view of an embodiment of the present technology of a point in the subject's motion versus an equivalent point in the target motion, where the target motion has been overlaid on a video image of the subject motion. FIG. 13A shows a target motion overlaid where the subject motion deviates from the target motion. Additionally, the target motion has been sized proportionally to maintain the target motion dimensions and be a similar height. FIG. 13B shows a target motion overlaid where the subject motion more closely matches the target motion. Additionally, the target motion has been adjusted to more closely match the subject's body dimensions.

Figure 14:
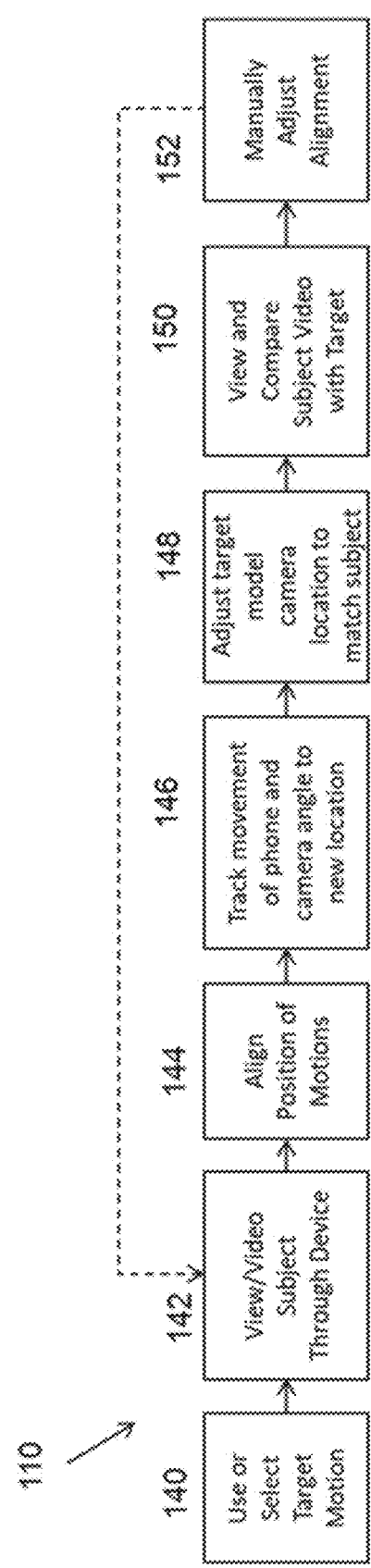
FIG. 14 is a process flow where a single smartphone (or other similar device) is used to view and compare a subject motion with a target motion from different viewing positions.

In accordance with an embodiment of the present technology, FIG. 14 depicts a process 110 where a single smartphone (or other similar device) is used to view and compare a subject motion with a target motion from different viewing positions. The user selects a target motion or uses the existing target for the subject (140). The user views the subject through the device (142) and aligns with the target motion position (e.g., behind a golfer in the ready position) (142) using automated and/or manual tools. Using the image from the smartphone, the distance to the subject can be estimated and using sensors within the smartphone to provide camera angle and to track position, the user can move to view from a different location to view the subject vs the target (146). The position of the target model adjusts automatically based on the new position of the smartphone (e.g., move to facing the golfer) (148). The user can view and compare the subject with the target (150) and if adjustments are required, the user can manually align the target with the subject (152). The user could then return to the initial position to assess if the position still aligns with the target, or for example, the user could walk all the way around the subject to assess the position relative to target from every direction. In this way, the subject could move through desired fixed positions throughout the full motion to assess the position compared to target at various points in the motion. In a 2D embodiment, the user can select from available 2D target motions and move to match the same camera angle and size to achieve a similar benefit, though more time consuming and limited to camera angles matching available target motions.

Comparison Reports

Where applicable, reports are provided comparing the subject's motion with experts in the field on key dimensions. Additionally, by evaluating the subject's motion on key dimension, a report can be generated notating what results are expected to be achieved with a properly executed target motion (e.g., a subject should be able to hit 300-yard drive with a 114-mph swing speed with a properly executed motion, based on data provided from the subject's actual motion).

12. Training

The technology disclosed herein allows comparison of a subject's motion superimposed or in another preferred position with a target motion as the subject executes the motion. Pace and mechanics can be developed simultaneously or independently. Points of synchronization are application specific and may be set automatically and/or selected by the user.

For pace training, the pace of the subject's motion is compared with the target motion pace.

For mechanics training, the system can allow for semi-automated and automated movement of the target motion to allow the subject to see himself or herself performing all or a portion of the motion at the same time as the target. In a semi-automated embodiment, the user can select a start and end point, loop the target video to either reset or play in reverse to return to the beginning and repeat, and select a desired pace to work through the motion at a desired speed.

In an automated "real-time" embodiment the subject can execute a motion at any desired pace. For example, a camera can capture the subject video which is combined with the target video in real-time and the combined video can be output to a display as the subject performs the motion. The system adjusts the pace of the target motion to synchronize with the motion being executed by the subject. For example, when the subject starts the motion, the target motion follows at the pace being executed. If the subject stops the motion, the target motion stops. If the subject moves back to the beginning, the target motion moves back to the beginning. With the target motion mimicking the subject's motion, there is substantial flexibility for the subject to work on various aspects of the motion. The subject may also choose to work on mechanics starting at any point throughout the motion. One implementation of a training program is for a subject to move through the motion in slow motion to match the mechanics of the target motion throughout the motion. This level of comparison provides breakthrough feedback for proper motion development.

Example embodiments of automated training implementation include, but are not limited to:

Simple: Simplified markerless motion capture techniques (or limited markers) are used to move the target video to match the subject's movement. The subject receives feedback by visually seeing the position within the target motion on a viewable display. The view of the 3D target model is adjusted to match the viewpoint of the video optics device(s) being used and the target and subject's motion are sized to match.

Advanced: More advanced markerless motion capture methods, such as those described in US Patent Publication 2010/0285877 and/or US Patent Publication 2009/0148000 to do full markerless motion capture in real-time of the subject's motion. The subject's motion model and target motion model can then be compared in real time. When differences are outside of the established tolerances, the subject is notified visually and/or audibly. The tolerances can be tightened as the subject improves the pace and mechanics.

The methods implemented for near real-time feedback depend on various aspects of the specific application and system configuration, including, but not limited to the bandwidth for transmitting data, number of video optics devices, computing power of main device running the application, presence of device for viewing during motion execution, and nature of the motion to being executed.

A Single Device Embodiment

In one embodiment of the present technology, a single smartphone (or other optical/computing device) is placed to record a motion at any desired angle. The system determines the location of the smartphone optics and derives a 2D target motion for that specific 2D plane. As the subject executes the motion, the subject's motion data is processed using markerless motion capture techniques, the target motion is moved to reasonably match the subject's motion, and differences are calculated. The subject can be audibly notified of the deviation, which may include specific areas of deviation (e.g., plane is too flat, right knee is moving too soon, etc.). The subject can then correct the deviation and continue or review the video of the executed motion versus the target using similar viewing functionality as described previously. Depending on device computing capability, response time from a remote server, and nature of the motion, functionality may be processed on the device or the server. Additional devices may be implemented that contain video optics to provide additional input. These devices may work independently (i.e., each looking at a 2D plane vs 3D model) or may work together for a 3D comparison. Further, an additional viewing device that may or may not include video optics that is used during the motion may be incorporated. For example, a tablet may be placed in a comfortable viewing area where video capture may or may not be implemented on the tablet. The tablet could receive video data from other device(s) through wired or wireless connections. Likewise, video optics devices can send data to a gaming console, or directly to a television through wired or wireless connections. In this way, training can be conducted in the comfort of a living room, for example.

A Multiple Device Embodiment

In another embodiment of the present technology, an integrated system with multiple video optics devices and localized computing of the full application is provided. A server connection may be used to obtain updates, additional motion data, save subject data for access directly from the server by a remote computing device, or a variety of additional reasons. For example, a teaching professional may use the system during a lesson and then save a recording of the lesson, subject motion data, and target motion data to the server. The subject can access this data on a tablet, smartphone, or other computing device to view or continue to work on aspects from the lesson.

Body Part Isolation

The training module allows subjects to develop the proper feel of different aspects of the motion by isolating specific body parts for training. For example, the lower body turn for a golf swing, the arm position for a tennis serve, the arm follow-through for bowling can all be isolated and worked on independently. Similar body part isolation can be used for detailed analysis versus a target model.

13. Motion Results

Results of a given motion are captured in a variety of ways. The present technology measures the location, speed and acceleration of desired points throughout a motion. Additionally, when the video resolution and shutter speed is sufficient, objects as applicable (e.g., club, racquet, ball, etc.), are also measured directly. If video resolution and shutter speed is not sufficient, then they are estimated algorithmically. For example, in golf, the club head speed, ball speed, and ball flight are all be measured or estimated. Additionally, or alternatively, sensors may be incorporated (e.g., golf club shaft mounted sensor). The user can also provide input through one of a variety of methods, including but not limited to a rating on a scale (e.g., 1 to 10), selecting from known categories (e.g., for golf, pull hook, push, slice, etc.), or manual entry. Input can also be recorded audibly as part of the video (i.e., after the motion is completed). Voice recognition may be used for simple results. The database of results mapped to motions helps identify causes of both positive and negative results for a given subject and more generally to the broader user group for the given motion. Sensor data also can be incorporated.

14. Recommendations

Recommendations for making adjustments to achieve a target motion are provided where fixes have been identified by experts or other users. In some cases, training aids may be recommended. Additionally, a database of user generated content, social networking and discussion boards help build community. For example, users that have solved a specific deviation can post information on how they solved it. Motions can be discussed and shared across users. Additionally, instructors can view motions and provide suggestions to users. The instructors input may include, but not be limited to adjusting target motions, developing isolated body movement, and providing a lesson plan.

15. Prediction

The present technology allows predicted results from a subject's motion based on deviation from the target motion, the subject's historical motions with associated results, and/or generally established known results for a given motion. The prediction engine can be used for practice or gaming.

16. Equipment Recommendations

Based on the subject's motion, the system provides equipment recommendations. For example, in golf there are a variety of methods to provide club recommendations including the type of club, type of shaft, angle of club, and grip size. The body motion data provides the key data necessary for a highly effective club fitting, 17. Gaming The present technology provides improvements for realistic gaming. The systems and methods described allow placement of the subject in a game. With the present technology, a realistic representation of the subject may be used, or the motion data can be used to animate a 3D character model. Additionally, the present technology allows gaming to occur with an actual appliance (e.g., club, racquet, etc.) instead of a sensor based appliance. Gaming consoles can also be used as computing and/or communication device, consistent with the methods and systems described herein.

18. Animation

The present technology provides an improved system for character animation. Just as a subject's video can be applied to a motion model to provide a realistic view of a target motion, an animated character or other avatar can be applied to motion models. Motions can be developed and combined to develop motions desired by those providing animation for the gaming or entertainment markets.

19. Object Measurement as Additional Data, or Stand Alone

The system and methods for measuring body motion can be directed to more specifically gather useful data on an object such as a golf dub and/or ball, tennis racquet and/or ball, baseball bat and/or ball, or a variety of other objects. While the body motion system can provide useful data on an object either through direct measurement or algorithmically from body motion data, configuring the system to measure the object more specifically (i.e., instead of all or a portion of a subject's body) can provide useful and more detailed information that supports the body motion data, as well as enable stand-alone applications, such as a launch monitor which provides detailed information on ball speed, ball spin, and the vector of the ball after contact. This system may incorporate simulators, such as golf simulators that allow golfers to play a virtual course. The actual data from the object (e.g., club path, angle of club face, ball position on ball) can be compared with target data to identify areas for improvement. Additionally, results can be computed using standard techniques for the given application (e.g., in golf, pull hook, straight slice, etc.).

Representative Embodiments

The following examples provide representative embodiments of the present technology. In other embodiments, aspects of these examples can be combined or eliminated in any of a variety of suitable manners.

A system and method for adding a person performing an activity from one video onto another video and saving as a single video.

A system and method for adding a person performing an activity onto a video of someone performing the same activity and comparing the activity.

A system and method of preparing target motions.

A system and method to time synchronize video data of two people performing the same activity.

A system and method to set and align camera position for comparison of two videos.

A system and method to automatically select from available 2D target videos and display on screen based on movement of a smartphone.

A system and method to display a 3D target model on a camera viewer that displays a person performing the same activity and adjusting the 3D model based on movement of the smartphone A system and method for superimposing skeletal or body model on pictures or video images to develop an individualized skeletal or body model.

A system and method for superimposing skeletal or body model on pictures or video images to develop motion models.

A method for selecting a target motion based on body type, comprising of gathering data on a subject's body type and comparing with body types that have target motions.

A method of selecting a target motion based on subject's motion data, comprising of gathering data on a subject's motion and comparing with characteristics of target motions.

A method for comparing a subject with a target model from multiple directions from a single smartphone or tablet device.

A method for adjusting a target motion to match a subject's dimensions, comprising of modifying a target motion with different dimensions than the subject to match the subject's dimensions while maintaining the characteristics of the target motion.

A method for adjusting the target motion to account for equipment or subject body constraints, comprising of modifying the target motion to account for equipment constraints (e.g., club length) or subject constraints (e.g., flexibility).

A method for adjusting the pace of a target motion, comprising of assessing the pace of the target motion relative to the subject's capabilities and adjusting the pace of the target motion to fit within the subject's capabilities or desires.

A system and method of using distributed devices to gather and transmit data for Markerless Motion Capture.

A system and method of using a single device to capture Markerless Motion Capture data from multiple repetitive motions.

A method to measure a 3D fixed position with a single video.

A method to perform superimposed comparison of subject and target motion.

A method to perform training to match a target motion. A method to perform equipment recommendations.

A system and method to provide swing speed, swing path, and launch monitor data.

Figure 15:
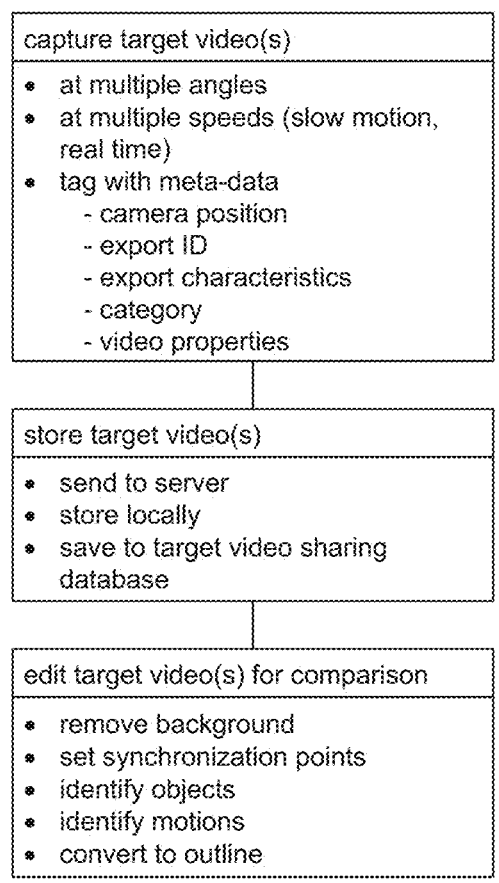
FIG. 15 is a process flow for preparing a target video for comparison.

FIG. 15 is a process flow 1500 for preparing a target video for comparison. The process flow for preparing a target video includes capturing a target video 1502, storing the target video 1504, and editing the target video for comparison 1506. In various implementations, these steps can be performed by a server system, local system, or a combination of the two. In various implementations, some of these steps can be excluded or performed in a different order from the order shown.

At block 1502, process flow 1500 can capture a target video. A target video can be a single video or a set of multiple videos, e.g. from different camera positions. In some implementations, a target video can be tagged with meta-data, such as a camera position the video was taken at, an identification of an expert shown in the target video, characteristics of an expert shown in the target video (e.g. body dimensions/characteristics, gender, age, equipment used, etc.), a category of the target video, or video properties. Video properties, for example, can include data from sensors on the device capturing the target video (e.g. GPS coordinates, accelerometer data, gyroscope data, etc.), frame rate, size, encoding/compression type, etc.

At block 1504, process flow 1500 can store the captured target video. This can include sending the target video to a server system or other remote system for storage, storing locally on a device that captured the target video, or providing the target video to a sharing system. Such a sharing system can, for example, allow other users to select the target video for comparison to their own subject videos.

At block 1506, process flow 1500 can edit the target video for later comparison. In some implementations, editing the target video can occur prior to the storing in block 1504 or after the storing, e.g. by an automated process for editing target videos by a server or in response to a selection of the target video for comparison with a subject video. Editing the target video for comparison can include identifying and removing all or part of a background, identifying particular points in the target video as synchronization points, identifying objects shown, identify motions shown, or converting an expert shown in the target video to an outline view or as partially transparent. In various implementations, removing a background can be accomplished through color analysis (e.g. identifying significant changes in color), object identifying (e.g. identifying body shapes and removing other aspects), motion isolation (e.g. identifying objects that move across video frames and removing other video portions), using a machine learning model trained to identify backgrounds, or using manual user selections.

Figure 16:
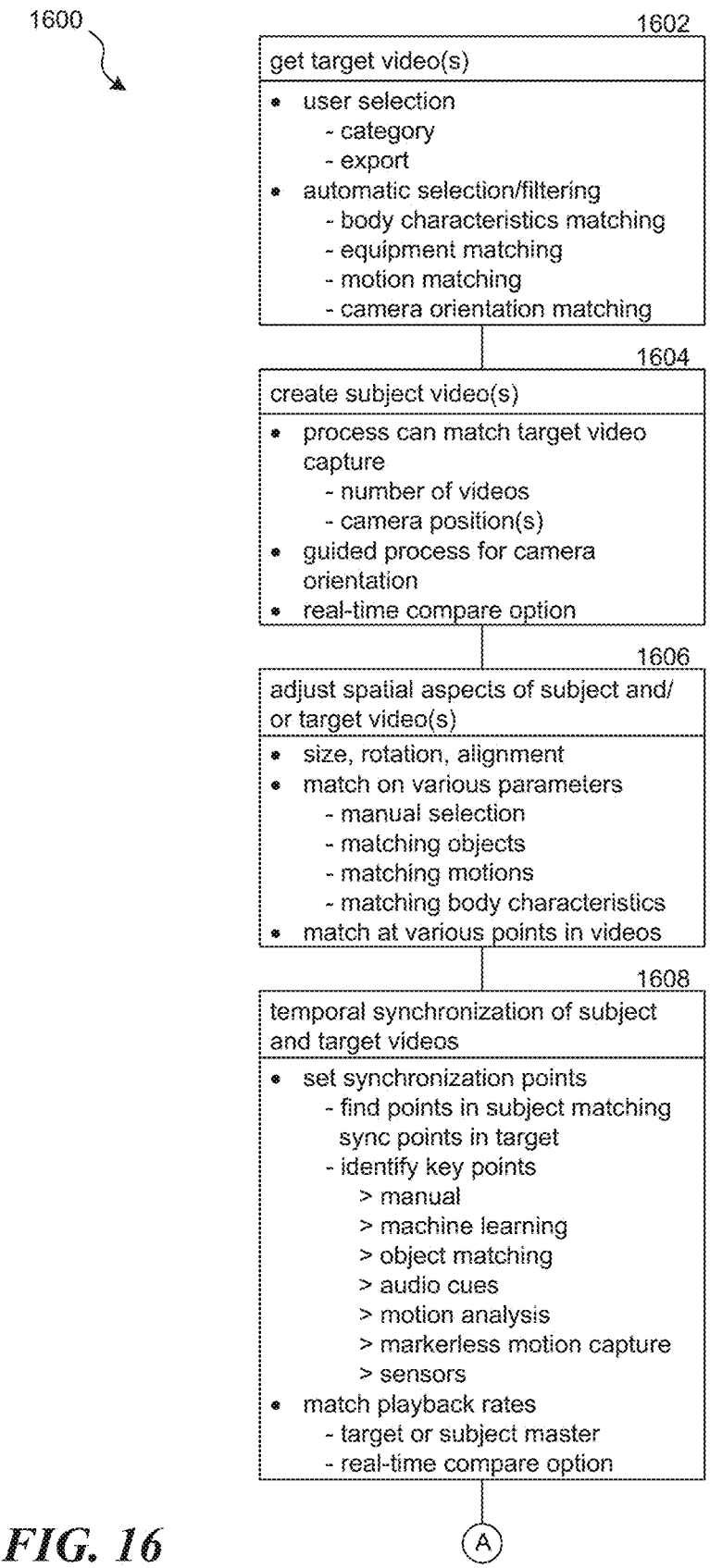
FIG. 16 is a process flow for generating a video combination comprising a target video and a subject video.
Figure 16:
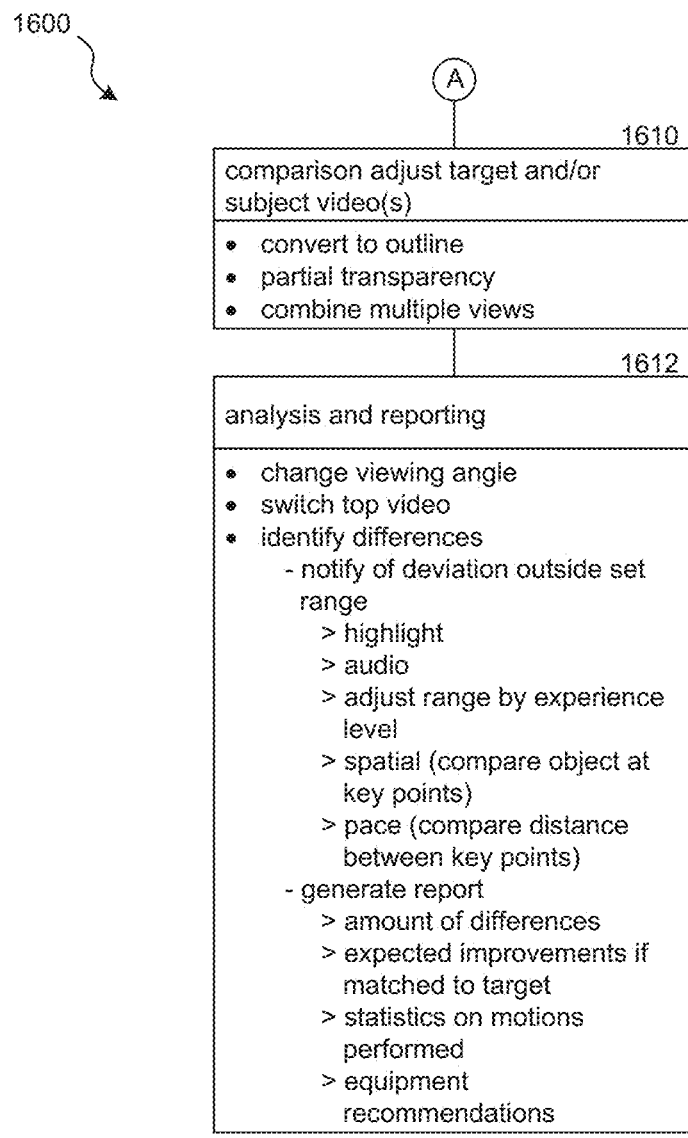

FIG. 16 is a process flow 1600 for generating a video combination comprising a target video and a subject video. The process flow for generating a video combination includes obtaining access to a target video 1602, creating a subject video 1604, adjusting spatial aspects of subject and/or target videos 1606, performing temporal synchronization of subject and target videos 1608, comparison adjusting the target and/or subject videos 1610, and performing analysis and reporting 1612. In various implementations, these steps can be performed by a server system, local system, or a combination of the two. In various implementations, some of these steps can be excluded or performed in a different order from the order shown.

At block 1602, process flow 1600 obtain a target video. In various implementations, the target video can be selected by a user or automatically selected by the system. In some implementations, the user can select the target video prior to capturing a subject video. This allows the user to tailor the subject video capture process so the subject video will match the target video. In some implementations, the user or system can select the target video based on aspects of the subject video. Factors for selecting the target video can include one or more of: a category (e.g. golf, basketball, squats, etc.), expert identification (e.g. Tiger Woods, Serina Williams, Michael Jordan, personal trainer 587, etc.), based on correspondences between body characteristics (e.g. height, weight, leg length, etc.) of an expert and a subject, correspondences between equipment used (e.g. club type, barbell weight, etc.), motion matching between the target video and a subject video, object matching between the target video and a subject video, or camera position matching between the target video and a subject video. In some implementations, a user can specify features the target video should correspond to (e.g. entering their height and gender).

At block 1604, process flow 1600 can create a subject video. Similarly, to the target video, a subject video can be a single video or a set of multiple videos, e.g. from different camera positions. In some implementations, capturing the subject video can include tailoring the video capture process to correspond to aspects of the selected target video. For example, the same number of videos can be captured at positions matching the target video. In some implementations, this can be an automated process, e.g. by identifying an object in the target video and causing a matching object in the subject video to be the same size or at the same position. In some implementations, the system can provide guidance to a user for capturing such a video, e.g. through onscreen arrows or other indicators specifying how to move the capture device to match the target video. In some implementations, a single capture device can be used to capture multiple versions of a subject performing repetitive motions, e.g. at different camera locations. In some implementations, multiple capture devices can be used to capture different angles of the same motion. In some implementations, the target motion is presented as a 3D model. In some implementations, the subject video is capture in real-time and continuously provided to the system for comparison with the target video. In some implementations, this real-time implementation can include a setup phase to instruct the user where to place the capture device(s) for the subject video. In some implementations, the real-time implementation can be setup to include one or more capture devices connected to a processing system that combines the subject video with a target video, in real-time, as discussed below, and outputs the resulting video comparison to a display (e.g. tablet, television, wearable device, etc.). This can allow the user to view their movements as compared to an expert as they perform them.

At block 1606, process flow 1600 can adjust spatial aspects of the subject and/or target videos. Adjusting spatial aspects of a subject or a target video can include changing a size, rotation, or alignment of the video. In some implementations, the adjustment can be done to a portion of the video. For example, an experts legs can be identified in the target video and the subject's legs can be identified in the subject video. The target video can be distorted such that the expert's legs are the same length as the subject's legs. In various implementations, the spatial aspects between the target video and the subject video can be matched on various parameters, such as through manual user selection, matching objects, matching motions, matching body characteristics, etc. In some implementations, the spatial adjustments can be performed at multiple points in the videos, e.g. spatial matching can be done for every 20 frames, every 1 second of video, at each synchronization point (discussed below), at the beginning, midpoint, and end of the videos, etc.

At block 1608, process flow 1600 can perform temporal synchronization of the subject and target videos. Temporal synchronization can include defining at least some synchronization points in the subject video that correspond to synchronization points in the target video. This can be accomplished through a user manually setting synchronization points and/or the system automatically identifying synchronization points. Identifying synchronization points can include identifying when there is a correspondence between the subject and target video (e.g. when similar motion is being performed, when similar sounds occur, etc.) or can include identifying a labeled point in each video and then finding corresponding points (e.g. identifying when a club is at the top of a swing or when it contacts a ball). In some implementations, a user manually sets beginning points of the target and subject videos to match. In various implementations, synchronization points can be automatically identified based on factors such as: using a trained machine learning model (e.g. a model trained to identify synchronization points for a category matching the category of the target video), by performing object matching and then determining when corresponding objects are in a similar location in the subject and target videos, using audio cues, through identified correspondences in motions in the subject and target videos, using other markerless motion capture techniques, or using sensors to identify particular motions.

Once synchronization points are set, the playback rate of segments between corresponding synchronization points in the target or subject videos can be adjusted. For example, if point S1 corresponds to the top of a golf backswing in the subject video, point T1 corresponds to the top of a golf backswing in the target video, point S2 corresponds to a club striking a ball in the subject video, point T2 corresponds to a club striking a ball in the target video, then the playback rate for the segment between S1 and S2 can be adjusted such that this segment has the same playback time as the segment between T1 and T2. In various implementations, either the segments in the target video can be time adjusted to match the corresponding segments in the subject video or the segments in the subject video can be time adjusted to match the corresponding target video segments.

In the real-time option discussed above, the system will constantly (e.g. every 5 ms, for each 10 frames captured, etc.) attempt to identify and display a corresponding point in the target video. This identifying can be accomplished using some of the methods described above such as by applying a machine learning model or markerless motion capture techniques. This also allows the system to constantly playback the target video to match the subject, even if the subject pauses or reverses his motion. In some implementations, the target motion is presented as a 3D model.

At block 1610, process flow 1600 can adjust target and/or subject video(s) for comparison. The adjustments at block 1610 can include any modification to either video such as preparing a version of either or both in an outline view or in a partially transparent view, combining multiple views into a single file, adding user controls, etc.

At block 1612, process flow 1600 can perform analysis and reporting functions. Analysis and reporting can include automatic comparison between the target and subject videos and providing feedback. The automatic analysis can include identifying differences between an expert and a subject, notifying a user (e.g. visually or through a sound) when such differences are outside an acceptable difference range (e.g. a threshold deviation amount), highlighting differences (e.g. changing color of a portion of the expert that doesn't overlap with the subject), performing a comparison of object positions at identified key points (e.g. at the top of a backswing), determining a difference in a subject's pace of performing a motion as compared to the pace of the expert, etc. In some implementations, a comparison report can identify various levels or amounts of difference between the subject video and target video, can indicate expected improvements if the subject were to adjust aspects to match the expert, can provide statistics such as overall speed, accuracy, etc. for the subject, can include equipment recommendations that may help the subject more closely match the motions of the expert, etc.

Block 1612 can also include providing tools to facilitate the user's analysis, such as an ability for the user to switch camera viewpoints or change which of the target or subject video is on top or in outline or a partially transparent mode.

Figure 17:
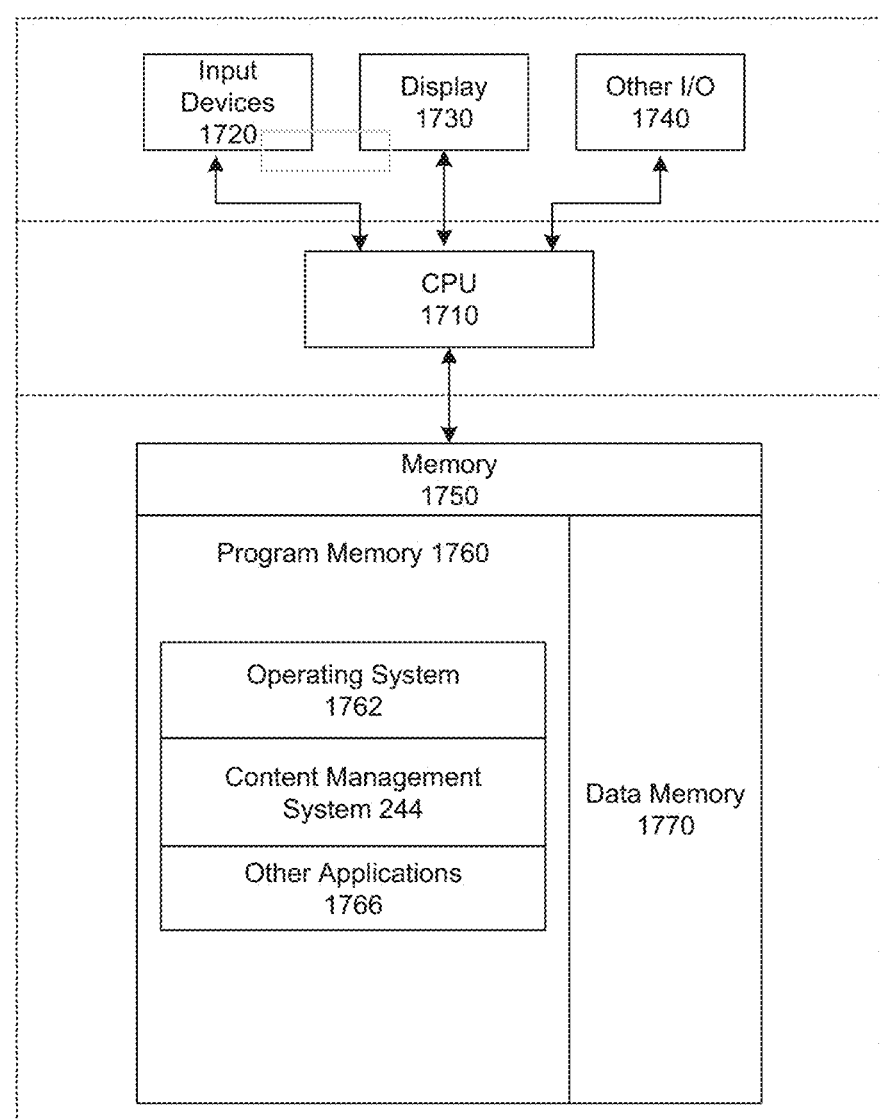
FIG. 17 is a block diagram illustrating an overview of devices on which some implementations can operate.

FIG. 17 is a block diagram illustrating an overview of devices on which some implementations of the disclosed technology can operate. The devices can comprise hardware components of a device 1700 that can generate comparisons between target and subject videos. Device 1700 can include one or more input devices 1720 that provide input to the Processor(s) 1710 (e.g. CPU(s), GPU(s), HPU(s), etc.), notifying it of actions. The actions can be mediated by a hardware controller that interprets the signals received from the input device and communicates the information to the processors 1710 using a communication protocol. Input devices 1720 include, for example, a mouse, a keyboard, a touchscreen, an infrared sensor, a touchpad, a wearable input device, a camera- or image-based input device, a microphone, or other user input devices.

Processors 1710 can be a single processing unit or multiple processing units in a device or distributed across multiple devices. Processors 1710 can be coupled to other hardware devices, for example, with the use of a bus, such as a PCI bus or SCSI bus. The processors 1710 can communicate with a hardware controller for devices, such as for a display 1730. Display 1730 can be used to display text and graphics. In some implementations, display 1730 provides graphical and textual visual feedback to a user. In some implementations, display 1730 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 1740 can also be coupled to the processor, such as a network card, video card, audio card, USB, firewire or other external device, camera, printer, speakers, CD-ROM drive, DVD drive, disk drive, or Blu-Ray device.

In some implementations, the device 1700 also includes a communication device capable of communicating wirelessly or wire-based with a network node. The communication device can communicate with another device or a server through a network using, for example, TCP/IP protocols. Device 1700 can utilize the communication device to distribute operations across multiple network devices.

The processors 1710 can have access to a memory 1750 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 1760 that stores programs and software, such as an operating system 1762, video comparison unit 1764, and other application programs 1766. Memory 1750 can also include data memory 1770 that can store data to be provided to the program memory 1760 or any element of the device 1700.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 18:
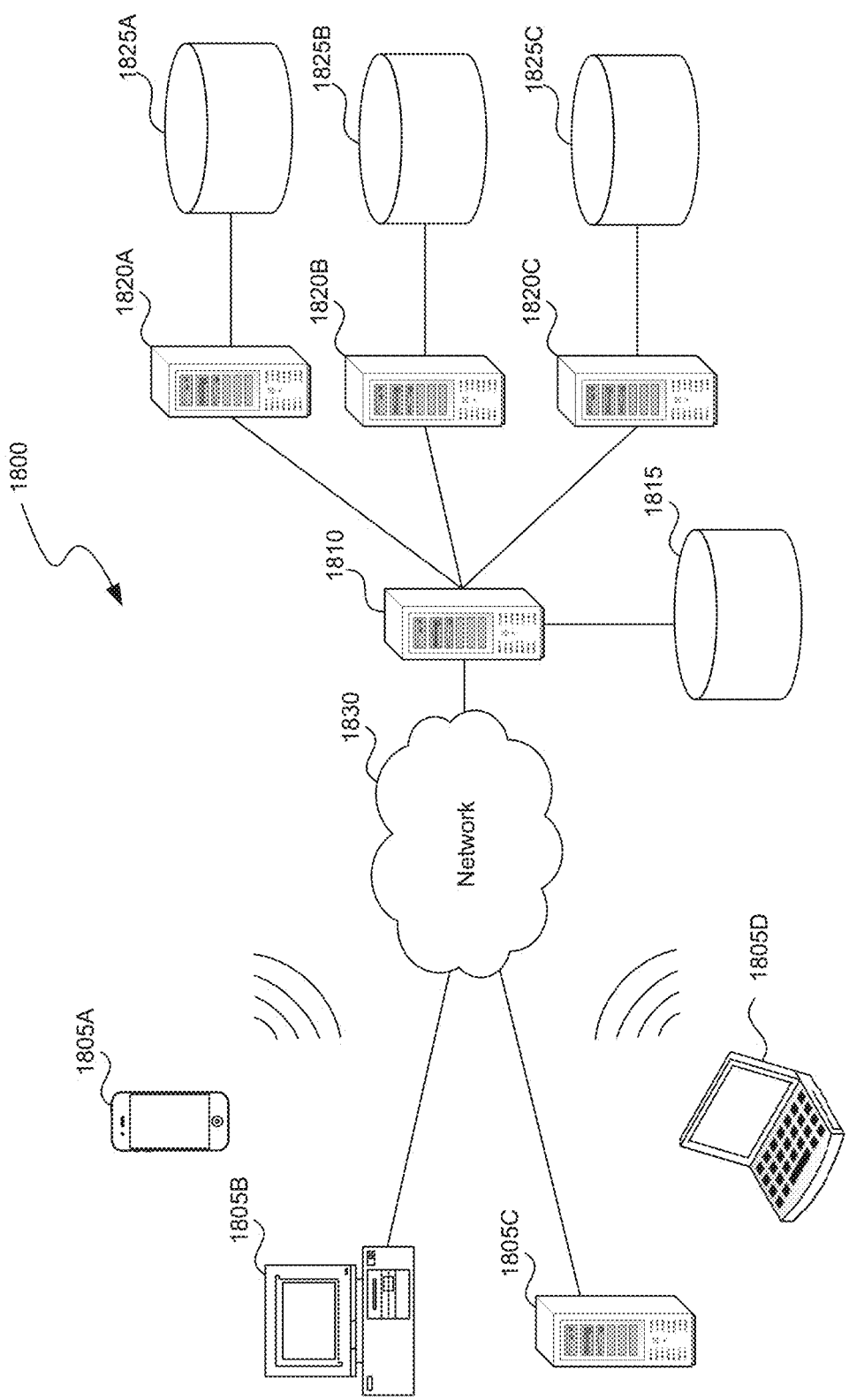
FIG. 18 is a block diagram illustrating an overview of an environment in which some implementations can operate.

FIG. 18 is a block diagram illustrating an overview of an environment 1800 in which some implementations of the disclosed technology can operate. Environment 1800 can include one or more client computing devices 1805A-D, examples of which can include device 1700. Client computing devices 1805 can operate in a networked environment using logical connections 1810 through network 1830 to one or more remote computers, such as a server computing device.

In some implementations, server 1810 can be an edge server which receives client requests and coordinates fulfillment of those requests through other servers, such as servers 1820A-C. Server computing devices 1810 and 1820 can comprise computing systems, such as device 1700. Though each server computing device 1810 and 1820 is displayed logically as a single server, server computing devices can each be a distributed computing environment encompassing multiple computing devices located at the same or at geographically disparate physical locations. In some implementations, each server 1820 corresponds to a group of servers.

Client computing devices 1805 and server computing devices 1810 and 1820 can each act as a server or client to other server/client devices. Server 1810 can connect to a database 1815. Servers 1820A-C can each connect to a corresponding database 1825A-C. As discussed above, each server 1820 can correspond to a group of servers, and each of these servers can share a database or can have their own database. Databases 1815 and 1825 can warehouse (e.g. store) information. Though databases 1815 and 1825 are displayed logically as single units, databases 1815 and 1825 can each be a distributed computing environment encompassing multiple computing devices, can be located within their corresponding server, or can be located at the same or at geographically disparate physical locations.

Network 1830 can be a local area network (LAN) or a wide area network (WAN), but can also be other wired or wireless networks. Network 1830 may be the Internet or some other public or private network. Client computing devices 1805 can be connected to network 1830 through a network interface, such as by wired or wireless communication. While the connections between server 1810 and servers 1820 are shown as separate connections, these connections can be any kind of local, wide area, wired, or wireless network, including network 1830 or a separate public or private network.

While the foregoing written description of the present technology enables one of ordinary skill to make and use what is considered presently to be the best mode thereof, those of ordinary skill will understand and appreciate the existence of variations, combinations, and equivalents of the specific embodiments, methods, and examples herein. The present technology should therefore not be limited by the above described embodiments, systems, methods, and examples, but instead can encompass other suitable embodiments, systems, and methods as well.

Several implementations of the disclosed technology are described above in reference to the figures. The computing devices on which the described technology may be implemented can include one or more central processing units, memory, input devices (e.g., cameras, keyboard, and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein a "match" refers to an identified difference in correlation or resemblance between two items (e.g, body parts or other objects, motions, synchronization points, etc.) that is no greater than a threshold. In various cases, the threshold is 0%, 10%, or 15%.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

If statements or subject matter in a document incorporated by reference conflicts with statements or subject matter of this application, then this application shall control.

The invention claimed is:

1. A computer-readable storage medium storing instructions that, when executed by a computing system, cause the computing system to perform operations for creating a video combination, the operations comprising:
   obtaining a target video by one or more of:
   manual selection of the target video; or
   automatic selection of the target video by:
   receiving a target category;
   identifying one or more first target videos showing an expert with target physical characteristics that correspond to subject physical characteristics of a subject, the subject physical characteristics either specified by a user or determined through automatic analysis of a subject video;

identifying one or more second target videos showing an expert with target motions that correspond to subject motions determined through automatic analysis of the subject video; and
selecting a target video that A) matches the target category, B) is one of the first target videos, and C) is one of the second target videos;
wherein the selected target video has been modified to have at least a background portion made transparent; and
wherein the selected target video is associated with camera positioning data indicating one or more camera locations;
obtaining a subject video by:
providing guidance to position one or more cameras based on the camera positioning data associated with the selected target video; and
receiving the subject video captured using the one or more cameras positioned according to the guidance;
adjusting spatial aspects of the target video or of the subject video such that particular spatial aspects of the target video corresponding to spatial aspects of the subject video, wherein the adjusting the spatial aspects comprises:
identifying a first size of a first identified object, in the subject video, comprising a body part or a piece of equipment; and
adjusting a second size of at least a portion of the target video, including a second identified object corresponding to the first identified object, to align with the first size;
identifying synchronization points between the target video and the subject video, wherein each synchronization point identifies a temporal correspondence of motions or objects between the target video and the subject video, based on one or more of:
manual selections of one or more of the synchronization points;
automatic selection of points where a location of an identified object in the target video corresponds to a location of a corresponding identified object in the subject video;
automatic selection of points where a motion identified in the target video correspond to a motion identified object in the subject video;
automatic selection of points where a timing of sounds from the target video correspond to timing of sounds from the subject video;
automatic selection of points by a machine learning model that was trained using a set of training videos corresponding to the target category with marked synchronization points; or
any combination thereof;
adjusting playback of one or more segments of the target video or of the subject video such that at least a first synchronization point in the target video is displayed at the same time as a corresponding synchronization point in the subject video during playback;
modifying the target video to create a version of the target video with at least a portion of the expert displayed as an outline or partially transparent;
creating the video combination to facilitate comparison of the target video with the subject video by overlaying the version of the target video with the subject video; and
facilitating comparison, in the video combination, between the version of the target video and the subject video by performing one or more of:
in response to a viewpoint selection, changing a viewpoint of the target video and changing a viewpoint of the subject view;
automatically identifying that a deviation between the expert in the target video and the subject in the subject video is above a threshold deviation amount, and in response, displaying a deviation indication or playing a sound;
extrapolating motions of the subject to correspond to motions of the expert and, based on the extrapolating, providing an expected performance difference;
identifying aspects of motions of the subject which would benefit from an equipment change and providing a suggestion of the equipment change; or
any combination thereof.

2. A method for creating a video combination, the method comprising:
obtaining a target video;
providing guidance to position a camera by displaying one or more images from the target video on a display while simultaneously displaying a live image of (a) a subject, or (b) an area where the subject will perform an activity, or (c) both (a) and (b), such that spatial aspects of the target video correspond to spatial aspects of the live image;
receiving a subject video captured using the camera positioned according to the guidance;
identifying synchronization points between the target video and the subject video, wherein an individual synchronization point identifies a temporal correspondence of at least one of motions or objects between the target video and the subject video;
adjusting playback of one or more segments of at least one of the target video or the subject video such that at least a first synchronization point in the target video is displayed at the same time as a corresponding synchronization point in the subject video during playback; and
displaying a video combination to facilitate comparison of the target video with the subject video by:
overlaying one of a version of the target video and a version of the subject video on the other.

3. The method of claim 2 wherein identifying synchronization points between the target video and the subject video comprises at least one manual selection of one or more of the synchronization points.

4. The method of claim 2 wherein identifying synchronization points between the target video and the subject video comprises automatic selection of at least one point where a location of an identified object in the target video corresponds to a location of a corresponding identified object in the subject video.

5. The method of claim 2 wherein identifying synchronization points between the target video and the subject video comprises automatic selection of at least one point where a motion identified in the target video correspond to a motion identified object in the subject video.

6. The method of claim 2 wherein identifying synchronization points between the target video and the subject video comprises automatic selection of at least one point where a timing of sounds from the target video correspond to timing of sounds from the subject video.

7. The method of claim 2 wherein identifying synchronization points between the target video and the subject video comprises automatic selection of at least one point by a machine learning model that was trained using a set of training videos corresponding to the target category with marked synchronization points.

8. The method of claim 2 wherein the version of the target video is the target video modified to display at least a portion of an expert in the target video as an outline or as partially transparent.

9. The method of claim 2 wherein facilitating the comparison of the target video with the subject video further comprises one or more of:
automatically identifying that a deviation between an expert shown in the target video and a subject shown in the subject video is above a threshold deviation amount, and in response, displaying a deviation indication or playing a sound;
extrapolating motions of the subject to correspond to motions of the expert and, based on the extrapolating, providing an expected performance difference; or
any combination thereof.

10. The method of claim 2
wherein the selected target video has been modified to have at least part of a background portion made transparent.

11. The method of claim 2 wherein providing guidance includes displaying one or more images from the target video on a display while simultaneously displaying a live image of the subject.

12. A system for creating a video combination, the system comprising:
one or more processors; and
a memory storing instructions that, when executed by a computing system, cause the computing system to perform operations comprising:
obtaining a target video;
providing guidance to position a camera by displaying one or more images from the target video on a display while simultaneously displaying a live image of (a) a subject, or (b) an area where the subject will perform an activity, or (c) both (a) and (b), such that spatial aspects of the target video correspond to spatial aspects of the live image;
receiving a subject video captured using the camera positioned according to the guidance;
identifying synchronization points between the target video and the subject video, wherein an individual synchronization point identifies a temporal correspondence of at least one of motions or objects between the target video and the subject video;
adjusting playback of one or more segments of at least one of the target video or the subject video such that at least a first synchronization point in the target video is displayed at the same time as a corresponding synchronization point in the subject video during playback; and
displaying a video combination to facilitate comparison of the target video with the subject video by overlaying one of a version of the target video and a version of the subject video on the other.

13. The system of claim 12 wherein either or both of the concurrently displayed version of the target video or version of the subject video can be freely repositioned within a display area in response to user input.

14. The system of claim 12 wherein identifying synchronization points between the target video and the subject video comprises automatic selection of at least one point where a location of an identified object in the target video corresponds to a location of a corresponding identified object in the subject video.

15. The system of claim 12 wherein identifying synchronization points between the target video and the subject video comprises automatic selection of at least one point where a motion identified in the target video correspond to a motion identified object in the subject video.

16. The system of claim 12 wherein identifying synchronization points between the target video and the subject video comprises automatic selection of at least one point where a timing of sounds from the target video correspond to timing of sounds from the subject video.

17. The system of claim 12 wherein the version of the subject video is the subject video modified to display at least a portion of a subject in the subject video as an outline or as partially transparent.

18. The system of claim 12 wherein facilitating the comparison of the target video with the subject video further comprises automatically identifying that a deviation between an expert shown in the target video and a subject shown in the subject video is above a threshold deviation amount.

19. A method for creating a video combination, the method comprising:
obtaining a three-dimensional target video model;
adjusting spatial aspects of the three-dimensional target video model such that particular spatial aspects of the target video model correspond to spatial aspects of a subject displayed simultaneously with the target video model on a two-dimensional display, wherein the process of adjusting includes:
setting one or more spatial reference points identifying a camera position relative to a live image of the subject or an area where the subject will perform an activity; and
displaying a two-dimensional view of the three-dimensional model corresponding to the camera position; and
receiving a subject video captured using the camera;
identifying synchronization points between a target video based on the target video model, and the subject video, wherein an individual synchronization point identifies a temporal correspondence of at least one of motions or objects between the target video and the subject video;
adjusting playback of one or more segments of the target video or of the subject video such that at least a first synchronization point in the target video is displayed at the same time as a corresponding synchronization point in the subject video during playback; and
creating the video combination to facilitate comparison of the target video with the subject video by overlaying one of a version of the target video and a version of the subject video on the other.

20. The method of claim 19 wherein the version of the target video is the target video modified to display at least a portion of an expert in the target video as an outline or as partially transparent.

21. The method of claim 19 wherein identifying synchronization points between the target video and the subject video comprises at least one manual selection of one or more of the synchronization points.

22. The method of claim 19 wherein identifying synchronization points between the target video and the subject video comprises automatic selection of at least one point where a location of an identified object in the target video corresponds to a location of a corresponding identified object in the subject video.

23. The method of claim 19 wherein identifying synchronization points between the target video and the subject video comprises automatic selection of at least one point where a motion identified in the target video correspond to a motion identified object in the subject video.

24. The method of claim 19 wherein identifying synchronization points between the target video and the subject video comprises automatic selection of at least one point where a timing of sounds from the target video correspond to timing of sounds from the subject video.

25. The method of claim 19 wherein identifying synchronization points between the target video and the subject video comprises automatic selection of at least one point by a machine learning model that was trained using a set of training videos corresponding to the target category with marked synchronization points.

26. The method of claim 19 wherein the version of the target video is the target video modified to display at least a portion of an expert in the target video as an outline or as partially transparent.

27. The method of claim 19 wherein facilitating the comparison of the target video with the subject video further comprises one or more of:

automatically identifying that a deviation between an expert shown in the target video and a subject shown in the subject video is above a threshold deviation amount, and in response, displaying a deviation indication or playing a sound;

extrapolating motions of the subject to correspond to motions of the expert and, based on the extrapolating, providing an expected performance difference; or any combination thereof.

\* \* \* \* \*

UNITED STATES PATENT AND TRADEMARK OFFICE
CERTIFICATE OF CORRECTION

PATENT NO. : 11,132,533 B2  
APPLICATION NO. : 15/997536  
DATED : September 28, 2021  
INVENTOR(S) : Dreessen Page 1 of 1

It is certified that error appears in the above-identified patent and that said Letters Patent is hereby corrected as shown below:

In the Drawings

On sheet 8 of 19, in Figure 8, reference numeral 114, Line 1, delete "2 D" and insert -- 2D --, therefor.

In the Specification

In Column 3, Line 22, delete "recorded" and insert -- recorded. --, therefor.

In Column 5, Line 34, delete "server;" and insert -- server, --, therefor.

In Column 5, Line 67, delete "technology," and insert -- technology. --, therefor.

In Column 11, Line 10, delete "alternatively;" and insert -- alternatively, --, therefor.

In Column 15, Line 66, delete "users" and insert -- user's --, therefor.

In Column 19, Line 37, delete "he" and insert -- the --, therefor.

In Column 19, Line 55, delete "AppleTV," and insert -- Apple TV, --, therefor.

In Column 24, Line 49, delete "fitting," and insert -- fitting. --, therefor.

In Column 25, Line 6, delete "dub" and insert -- club --, therefor.

In Column 25, Line 49, delete "smartphone" and insert -- smartphone. --, therefor.

In Column 32, Line 5, delete "(e.g," and insert -- (e.g. --, therefor.

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*